US012667114B2

(12) United States Patent
Takeguchi et al.

(10) Patent No.: US 12,667,114 B2
(45) Date of Patent: Jun. 30, 2026

(54) METHOD FOR PRODUCING POWDERED OIL AND/OR FAT COMPOSITION

(71) Applicant: The Nisshin OilliO Group, Ltd., Tokyo (JP)

(72) Inventors: Seiya Takeguchi, Yokohama (JP); Tetsuro Iwasawa, Tokyo (JP)

(73) Assignee: The Nisshin OilliO Group, Ltd., Tokyo (JP)

( * ) Notice: Subject to any disclaimer, the term of this patent is extended or adjusted under 35 U.S.C. 154(b) by 287 days.

(21) Appl. No.: 18/547,544

(22) PCT Filed: Mar. 29, 2022

(86) PCT No.: PCT/JP2022/015488
§ 371 (c)(1),
(2) Date: Aug. 23, 2023

(87) PCT Pub. No.: WO2022/230559
PCT Pub. Date: Nov. 3, 2022

(65) Prior Publication Data
US 2024/0130389 A1    Apr. 25, 2024
US 2024/0225029 A9    Jul. 11, 2024

(30) Foreign Application Priority Data
Apr. 30, 2021    (JP) ................................. 2021-077898

(51) Int. Cl.
*A23D 9/007*      (2006.01)
*A23D 7/01*       (2006.01)

(52) U.S. Cl.
CPC .............. *A23D 9/007* (2013.01); *A23D 7/011* (2013.01)

(58) Field of Classification Search
CPC ................................. A23D 9/007; A23D 7/011
(Continued)

(56) References Cited

U.S. PATENT DOCUMENTS 5,514,406 A       5/1996  Aoe et al.
2018/0249729 A1   9/2018  Kataoka et al.

FOREIGN PATENT DOCUMENTS

GB        1564363 A      4/1980
JP        S52-71390 A    6/1977
(Continued)

OTHER PUBLICATIONS

Rye et al., Fat Crystal Networks, Bailey's Industrial Oil and Fat Products, Sixth Edition, Six Volume Set (2005).*
Kim et al., Optimum Design for an Air Current Pulverizing Blade Using the Computational Fluid Dynamics, Journal of the Korean Society of Manufacturing Process Engineers, vol. 19, No. 8, pp. 8 ~ 14 (2020).*
Translation of WO-2018174203-A1.*
(Continued)

*Primary Examiner* — Brent T O'Hern
(74) *Attorney, Agent, or Firm* — BUCHANAN INGERSOLL & ROONEY PC

(57)                ABSTRACT

Described is a method for producing powdered oil and/or fat composition containing an oil and/or fat component that includes one or more XXX-type triglycerides with specific fatty acid residue X, the method comprising (a) preparing solid oil and/or fat composition raw material containing XXX-type triglycerides; (b) heating the solid oil and/or fat composition raw material obtained in (a) at a temperature below melting point thereof to transform the oil and/or fat component in the solid oil and/or fat composition raw material into β-type oil and/or fat, thereby obtaining β-type oil and/or fat-containing composition raw material; and (c) pulverizing the β-type oil and/or fat-containing composition raw material obtained in (b) by collision among the raw materials without mechanical pulverization, thereby obtaining powdered oil and/or fat composition.

10 Claims, 5 Drawing Sheets

(58) Field of Classification Search
USPC ......................................................... 426/601
See application file for complete search history.

(56) References Cited

FOREIGN PATENT DOCUMENTS

| JP | H06-245700 A | 9/1994 |
|----|----|----|
| JP | 2003-023953 A | 1/2003 |
| JP | 2003-023987 A | 1/2003 |
| JP | 2003-024019 A | 1/2003 |
| JP | 2021-016320 A | 2/2021 |
| WO | 2017051910 A1 | 3/2017 |
| WO | 2018-056415 A1 | 3/2018 |
| WO | WO-2018174203 A1 * | 9/2018 |
| WO | 2020-026946 A1 | 2/2020 |

OTHER PUBLICATIONS

International Search Report (PCT/ISA/210) with an English translation, and Written Opinion (PCT/ISA/237) mailed on Jun. 14, 2022, by the Japan Patent Office as the International Searching Authority for International Application No. PCT/JP2022/015488. (10 pages).

Ito, "Development of New Food Materials by Airflow Type Pulverizer", Minacron Mill, Food Industry, 2009, vol. 52, No. 22, pp. 59-67, with partial English translation.

Office Action issued on Jul. 13, 2021, by the Japan Patent Office in corresponding Japanese Application No. 2021-077898. (11 pages).

Extended European Search Report dated Mar. 11, 2025, issued by the European Patent Office in corresponding European Application No. 22795475.7-1105, (13 pages).

* cited by examiner

METHOD FOR PRODUCING POWDERED OIL AND/OR FAT COMPOSITION

TECHNICAL FIELD

The present invention relates to a method for producing a powdered oil and/or fat composition. More specifically, the present invention relates to a method for producing a powdered oil and/or fat composition, wherein the powdered oil and/or fat composition contains an oil and/or fat component, including an XXX-type triglyceride, and the powdered oil and/or fat composition has a specific loose bulk density and the like.

BACKGROUND ART

To date, a powdered oil and/or fat composition has been developed which involves melting raw material for an oil and/or fat composition containing XXX-type triglycerides, then cooling and solidifying it to contain a β-type oil and/or fat, resulting in a powdered oil and/or fat composition with a plate-like particle shape (Patent Literature 1). This powdered oil and/or fat composition has been used to improve the powder fluidity of various powders and for other purposes, but a material that can further enhance powder fluidity had been sought. Additionally, methods for preparing a powdered oil and/or fat composition have been known, such as a method of pulverizing an oil and/or fat with high solid fat content at room temperature, like extremely hardened oil, and then sieving to uniform particle size (Patent Literature 2), and a method of melting an oil and/or fat with high solid fat content at room temperature, like extremely hardened oil, and then directly spraying (Patent Literature 3), but a more industrially suitable method has been sought due to the complexity of the processes. Furthermore, a material that could further enhance the powder fluidity more than the powdered oil and/or fat produced by these methods has also been sought.

CITATION LIST

Patent Literatures

Patent Literature 1: International Publication No. WO2017/051910
Patent Literature 2: Japanese Patent Application Publication No. Sho 52-71390
Patent Literature 3: Japanese Patent Application Publication No. Hei 6-245700

SUMMARY OF INVENTION

One object of the present invention may be to provide a method for producing a powdered oil and/or fat composition that includes an oil and/or fat component containing an XXX-type triglyceride.

Another object of the present invention may be to provide a method for producing a powdered oil and/or fat composition that contains a β-type oil and/or fat as an oil and/or fat component, and has specific loose bulk density and the like.

Means for Solution of the Problems

To achieve the above objects, the present inventors have found that it is possible to provide a powdered oil and/or fat composition that has a specific loose bulk density and the like as well as novel characteristics, such as improved fluidity, by the steps of transforming a solid oil and/or fat composition raw material into a β-type oil and/or fat using a specific method and pulverizing a β-type oil and/or fat-containing composition raw material, having the resulting β-type oil and/or fat as a main component, using a specific method. This led to the present invention. Specifically, the present invention may include the following aspects.

[A]

A method for producing a powdered oil and/or fat composition containing an oil and/or fat component that includes one or more XXX-type triglycerides with a fatty acid residue X having x carbon atoms at positions 1 to 3 of glycerin, wherein the number of carbon atoms, x, is an integer selected from 16 to 20, and the oil and/or fat component includes a β-type oil and/or fat, and the powdered oil and/or fat composition has a loose bulk density of 0.05 to 0.6 g/cm³, the method for producing a powdered oil and/or fat composition comprising the following steps:

(a) preparing a solid oil and/or fat composition raw material containing XXX-type triglycerides;

(b) heating the solid oil and/or fat composition raw material obtained in the step (a) at a temperature below a melting point thereof to transform the oil and/or fat component in the solid oil and/or fat composition raw material into β-type oil and/or fat, thereby obtaining a β-type oil and/or fat-containing composition raw material; and (c) pulverizing the β-type oil and/or fat-containing composition raw material obtained in the step (b) by collision of the raw materials without mechanical pulverization, thereby obtaining a powdered oil and/or fat composition.

[B]

The method for producing a powdered oil and/or fat composition according to [A], containing 50% by mass or more of the XXX-type triglycerides in the powdered oil and/or fat composition when a total mass of the powdered oil and/or fat composition is set to 100% by mass.

[C]

The method for producing a powdered oil and/or fat composition according to [A] or [B], wherein the temperature below the melting point in the step (b) is lower by 1 to 30° C. than the melting point of the solid oil and/or fat composition raw material.

[D]

The method for producing a powdered oil and/or fat composition according to any one of [A] to [C], wherein the step (b) is performed while the solid oil and/or fat composition raw material is left standing.

[E]

The method for producing a powdered oil and/or fat composition according to any one of [A] to [C], wherein the step (b) is performed while the solid oil and/or fat composition raw material is left non-standing.

[F]

The method for producing a powdered oil and/or fat composition according to [E], wherein the non-standing state is a state of stirring the solid oil and/or fat composition raw material.

[G]

The method for producing a powdered oil and/or fat composition according to any one of [A] to [F], wherein the pulverization by collision of the raw materials in the step (c) is pulverization using an airflow pulverizer without mechanical pulverization.

[H]

The method for producing a powdered oil and/or fat composition according to any one of [A] to [G], wherein the solid oil and/or fat composition raw material containing the XXX-type triglycerides is rapeseed extremely hardened oil.

[I]

The powdered oil and/or fat composition produced by the method for producing a powdered oil and/or fat composition according to any one of [A] to [H].

[J]

The powdered oil and/or fat composition according to [I], including at least one of the following characteristics:

(i) in an X-ray diffraction peak of the oil and/or fat component, an intensity ratio of a peak around 4.6 Å, which is characteristic of the β-type, and a peak around 4.2 Å, which is characteristic of the α-type: [peak intensity around 4.6 Å/(peak intensity around 4.6 Å+peak intensity around 4.2 Å)] is 0.6 to 1;

(ii) an aggregation degree of the powdered oil and/or fat composition is 60% or less;

(iii) the loose bulk density of the powdered oil and/or fat composition is 0.05 to 0.6 g/cm³;

(iv) a repose angle relative value calculated by formula (I) is 90% or less:

Repose angle relative value=[Repose angle of the mixed powder of the powdered oil and/or fat composition and powdered starch]/[Repose angle of the powdered starch only, without the powdered oil and/or fat composition]×100    (I)

(in formula (I), "mixed powder" contains 1% by mass of the powdered oil and/or fat composition based on the total mass of the mixed powder); and (v) the powdered oil and/or fat composition has a form of flake-containing particles possessing multiple flakes on the surface.

Moreover, the present invention may include the following aspects.

[1] A powdered oil and/or fat composition containing an oil and/or fat component that includes one or more XXX-type triglycerides with a fatty acid residue X having x carbon atoms at positions 1 to 3 of glycerin, wherein the number of carbon atoms, x, is an integer selected from 16 to 20, and the oil and/or fat component includes a β-type oil and/or fat, the powdered oil and/or fat composition comprising at least one of the following characteristics:

(i) in an X-ray diffraction peak of the oil and/or fat component, an intensity ratio of a peak around 4.6 Å, which is characteristic of the β-type, and a peak around 4.2 Å, which is characteristic of the α-type: [peak intensity around 4.6 Å/(peak intensity around 4.6 Å+peak intensity around 4.2 Å)] is 0.6 to 1;

(ii) the aggregation degree of the powdered oil and/or fat composition is 60% or less;

(iii) the loose bulk density of the powdered oil and/or fat composition is 0.05 to 0.6 g/cm³; and (iv) the repose angle relative value calculated by formula (I) is 90% or less:

Repose angle relative value=[Repose angle of the mixed powder of the powdered oil and/or fat composition and powdered starch]/[Repose angle of the powdered starch only, without the powdered oil and/or fat composition]×100    (I)

(in formula (I), "mixed powder" contains 1% by mass of the powdered oil and/or fat composition based on the total mass of the mixed powder).

[2] The powdered oil and/or fat composition according to [1] above, containing 50% by mass or more of the XXX-type triglycerides in the powdered oil and/or fat composition when a total mass of the powdered oil and/or fat composition is set to 100% by mass.

[3] The powdered oil and/or fat composition according to [1] or [2] above, wherein the powdered oil and/or fat composition has a form of flake-containing particles possessing multiple flakes on the surface.

[4] The powdered oil and/or fat composition according to [3] above, wherein an average particle diameter based on a volume average diameter of the particles is 0.5 to 200 μm.

[5] The powdered oil and/or fat composition according to [3] or [4] above, wherein an average length of a long side of the flakes is 0.1 to 5 μm.

[6] A food comprising the powdered oil and/or fat composition according to any one of [1] to [5] above.

[7] A powder fluidity improver comprising the powdered oil and/or fat composition according to any one of [1] to [5] above.

[8] A powdered oil and/or fat composition obtained by the method for producing a powdered oil and/or fat composition according to any one of [A] to [G].

Advantageous Effects of Invention

The present invention makes it possible to provide a method for producing a powdered oil and/or fat composition that includes an oil and/or fat component containing an XXX-type triglyceride.

The present invention also makes it possible to provide a method for producing a powdered oil and/or fat composition that contains a β-type oil and/or fat as an oil and/or fat component, and has specific loose bulk density and the like.

BRIEF DESCRIPTION OF THE SEVERAL VIEWS OF THE DRAWING(S)

DESCRIPTION OF EMBODIMENTS

Figure 1:
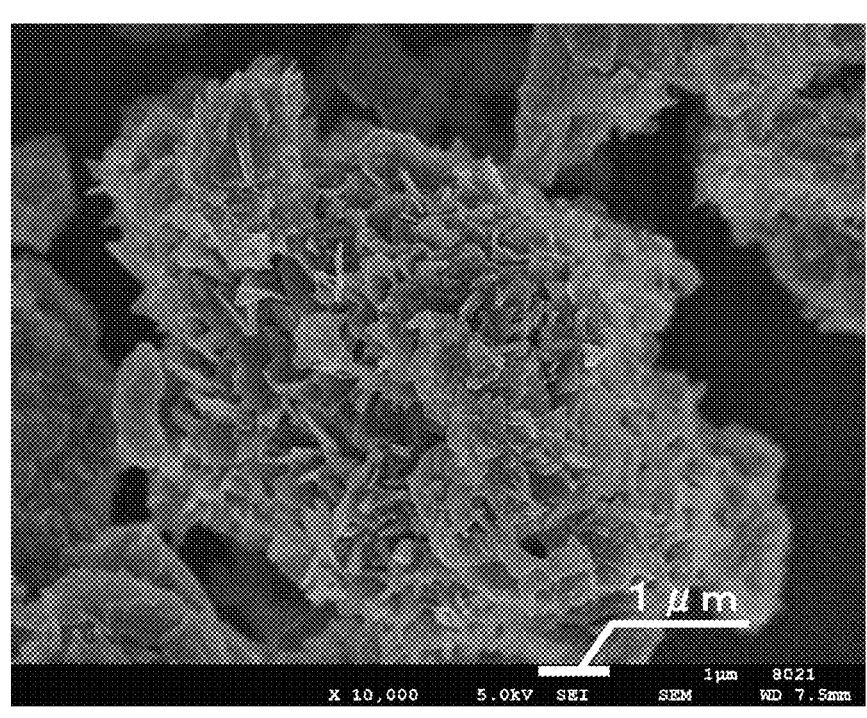
FIG. 1 is a microscopic appearance photograph of the powdered oil and/or fat composition (β-type oil and/or fat) from Production Example 1.

Hereinafter, the embodiments for implementing the invention will be detailed, and regardless of the expressions such as "preferable" or "more preferable," the preferable modes and more preferable modes illustrated below can be combined together as appropriate. Also, the description of numerical ranges is exemplary, and a range combining the upper limit and lower limit of each range and the numerical values of the Examples can also be used preferably. Furthermore, terms such as "contains" or "including" may be interpreted as "composed essentially of" or "composed only of".

<Powdered Oil and/or Fat Composition>

An aspect of the present invention relates to a method for producing a powdered oil and/or fat composition, the powdered oil and/or fat composition containing an oil and/or fat component that includes one or more XXX-type triglycerides with a fatty acid residue X having x carbon atoms at positions 1 to 3 of glycerin, wherein the number of carbon atoms, x, is an integer selected from 16 to 20, and the oil and/or fat component includes a β-type oil and/or fat, and the powdered oil and/or fat composition has a loose bulk density of 0.05 to 0.6 g/cm$^3$, and optionally, in an X-ray diffraction peak of the oil and/or fat component, an intensity ratio of a peak around 4.6 Å, which is characteristic of the β-type, and a peak around 4.2 Å, which is characteristic of the α-type ([peak intensity around 4.6 Å/(peak intensity around 4.6 Å+peak intensity around 4.2 Å)](hereinafter also referred to as the peak intensity ratio)) is 0.6 to 1, and optionally, an aggregation degree of the powdered oil and/or fat composition is 60% or less. First, the powdered oil and/or fat composition obtained by the production method will be described in detail below.

<Oil and/or Fat Component>

The powdered oil and/or fat composition of the present invention contains an oil and/or fat component. The oil and/or fat component includes at least an XXX-type triglyceride and can optionally include additional triglycerides.

The oil and/or fat component includes β-type oil and/or fat. Here, β-type oil and/or fat refers to an oil and/or fat composed only of the β-type crystals, one of the crystal polymorphs of oil and/or fat. Other crystal polymorphs of oil and/or fat include β'-type oil and/or fat and α-type oil and/or fat, where β'-type oil and/or fat is an oil and/or fat composed only of the β'-type crystals, one of the crystal polymorphs of oil and/or fat. α-type oil and/or fat refers to an oil and/or fat composed only of the α-type crystals, one of the crystal polymorphs of oil and/or fat. There are oils and/or fats whose crystals, although of the same composition, have different sublattice structures (crystal structures), which are called crystal polymorphs. Typically, there are hexagonal, orthorhombic perpendicular, and triclinic parallel types, which are referred to as α-type, β'-type, and 0-type, respectively. Furthermore, the melting points of those polymorphs are higher in the order of α, β', β, and the melting points of these polymorphs differ depending on the type of fatty acid residue X having x carbon atoms, so that the melting points (° C.) of the polymorphs are shown in Table 1 below, in the case of tripalmitin, tristearin, and triarachidin. Note that Table 1 was prepared based on Nissim Garti et al., "Crystallization and Polymorphism of Fats and Fatty Acids", Marcel Dekker Inc., 1988, pp. 32-33. In preparing Table 1, the temperature (° C.) of the melting point was rounded to the nearest whole number. Also, if the composition of the oil and/or fat and the melting point of each polymorph are known, it is possible to detect whether or not β-type oil and/or fat is present in at least that oil and/or fat.

TABLE 1

| | α-Type Oil and/or Fat (° C.) | β'-Type Oil and/or Fat (° C.) | β-Type Oil and/or Fat (° C.) |
|---|---|---|---|
| Tripalmitin | 45 | 57 | 66 |
| Tristearin | 55 | 63 | 74 |
| Triarachidin | 62 | 69 | 78 |

A common method for identifying these polymorphs is X-ray diffraction, and the diffraction conditions are given by the following Bragg's formula.

$$2d \sin \theta = n\lambda \ (n=1,2,3 \ldots ).$$

Diffraction peaks appear at positions satisfying this formula. Here, d represents the lattice constant, θ is the diffraction (incident) angle, λ is the wavelength of the X-ray, and n is a natural number. Information on the packing of the side faces in the crystal (sublattice) can be obtained from the diffraction peaks corresponding to the short-side spacing with 2θ=16 to 27°, which allows for the identification of polymorphs. Particularly in the case of triacylglycerols, characteristic peaks of the β-type appear at 2θ=19, 23, 24° (around 4.6 Å, around 3.9 Å, around 3.8 Å), and a characteristic peak of the α-type appears around 210 (4.2 Å). Note that X-ray diffraction measurements are made using, for example, an X-ray diffractometer (Rigaku Corporation, fully automatic multi-purpose X-ray diffractometer Smart Lab 9 kW) maintained at 20° C. The most commonly used X-ray source is CuKα rays (1.54 Å).

Here, the oil and/or fat component includes β-type oil and/or fat, preferably, those in which the peak intensity ratio of X-ray diffraction peak is 0.6 to 1, or those that contain β-type oil and/or fat as the main component (over 50% by mass based on the powdered oil and/or fat composition or oil and/or fat component).

A preferable embodiment of the oil and/or fat component is such that the oil and/or fat component is composed essentially of β-type oil and/or fat, and a more preferable embodiment is such that the oil and/or fat component is composed of β-type oil and/or fat, and a particularly preferable embodiment is such that the oil and/or fat component is composed only of β-type oil and/or fat. When all of the oil and/or fat components are β-type oil and/or fat, it means that α-type oil and/or fat and/or β'-type oil and/or fat is not detected by differential scanning calorimetry.

In a further embodiment of the present invention, it is preferable that all oil and/or fat components are β-type oil and/or fat, but it is permissible to include other α-type oil and/or fat and β'-type oil and/or fat.

Specifically, based on the aforementioned knowledge of X-ray diffraction measurements, an index representing the abundance of β-type oil and/or fat in the oil and/or fat components is calculated by the ratio of the peak intensity at 2θ=19° (4.6 Å), a characteristic peak of the β-type, to the peak intensity at 2θ=21° (4.2 Å), a characteristic peak of the α-type: peak intensity around 19°/(peak intensity around 19°+peak intensity at 21°) [peak intensity around 4.6 Å/(peak intensity around 4.6 Å+peak intensity around 4.2 Å)]. From this, it can be understood to "include β-type oil and/or fat". Ideally, in the present invention, all oil and/or fat components are β-type oil and/or fat (that is, the peak intensity ratio=1).

In other words, if this peak intensity ratio is 0, it is understood that all is α-type oil and/or fat, and if the peak intensity ratio is 1, it is understood that all is β-type oil and/or fat, and further, if the peak intensity ratio is a number close to 1, it is understood that there is a larger amount of β-type oil and/or fat.

In the present invention, since it is preferable to have more β-type oil and/or fat in the oil and/or fat components, it is preferable for the peak intensity ratio to have a value close to 1.

Therefore, the peak intensity ratio is preferably 0.6 to 1, more preferably 0.7 to 1, further preferably 0.8 to 1, further more preferably 0.9 to 1, and particularly preferably 0.95 to 1.

The oil and/or fat components of the present invention may be about 50 to 100% by mass, 70 to 100% by mass, 80 to 100% by mass, 85 to 100% by mass, 92 to 100% by mass, or 95 to 100% by mass based on the powdered oil and/or fat composition.

<XXX-Type Triglyceride>

The oil and/or fat component of the present invention contains one or more XXX-type triglycerides that have a fatty acid residue X having x carbon atoms at positions 1 to 3 of glycerin. These XXX-type triglycerides are triglycerides that have a fatty acid residue X having x carbon atoms at positions 1 to 3 of glycerin, and each fatty acid residue X is the same as the others. Here, the number of carbon atoms, x, is an integer selected from 16 to 20, preferably an integer selected from 16 to 18, and more preferably, it is 18.

Fatty acid residue X may be a saturated or unsaturated fatty acid residue. As a specific fatty acid residue X, for example, residues such as palmitic acid, stearic acid, and arachidic acid can be mentioned but are not limited to these. More preferable fatty acids are palmitic acid and stearic acid, and further preferable is stearic acid.

The content of these XXX-type triglycerides, when considering the total mass of the powdered oil and/or fat composition or oil and/or fat component as 100% by mass, is in a range of, for example, 50% by mass or more, preferably 60% by mass or more, more preferably 70% by mass or more, and further preferably 80% by mass or more as a lower limit, and for example, 100% by mass or less, preferably 99% by mass or less, and more preferably 95% by mass or less as an upper limit. XXX-type triglycerides can be used in one type or two or more types, and preferably, it is one type or two types, and more preferably, one type is used. If there are two or more types of XXX-type triglycerides, their total amount becomes the content of XXX-type triglycerides.

<Additional Triglycerides>

The oil and/or fat component of the present invention may include additional triglycerides other than the aforementioned XXX-type triglycerides, as long as the effects of the present invention are not impaired. These additional triglycerides may be multiple types of triglycerides and can be either synthetic oils and/or fats or natural oils and/or fats. The synthetic oils and/or fats include glyceryl tricaprate and glyceryl tricaprylin. Examples of the natural oils and/or fats include cocoa butter, sunflower oil, rapeseed oil, soybean oil, and cottonseed oil. When the total triglycerides in the powdered oil and/or fat composition or oil and/or fat component of the present invention are set to 100% by mass, even if these additional triglycerides contain, for example, about 1% by mass or more, or 5 to 50% by mass, of the total mass, 100% by mass, of the powdered oil and/or fat composition or oil and/or fat component, there would be no problem. The content of these additional triglycerides is, for example, 0 to 50% by mass, preferably 5 to 40% by mass, more preferably about 10 to 30% by mass, and further preferably 15 to 25% by mass, when the total mass of the powdered oil and/or fat composition or oil and/or fat component is set to 100% by mass.

<Additional Component>

The powdered oil and/or fat composition of the present invention may contain, in addition to the oil and/or fat components such as the above-mentioned triglycerides, additional components (additives) such as optional emulsifiers, fragrances, and colorants. These optional additional components can also be externally added to the powdered oil and/or fat composition of the present invention.

For example, as the emulsifiers among these additional components, monoglycerides, polyglycerin fatty acid esters, sucrose fatty acid esters, sorbitan fatty acid esters, lecithin, and the like can be mentioned. As fragrances, limonene, vanillin, orange, vanilla, jasmine, and the like can be mentioned. As colorants, for example, turmeric pigments, gardenia pigments, safflower pigments, paprika pigments, red cabbage pigments, and other natural colorants, as well as synthetic colorants such as tar-based colorants, can be mentioned.

The amount of these additional components can be any amount as long as the effects of the present invention are not impaired, but for example, when the total mass of the powdered oil and/or fat composition is set to 100% by mass, it may be, for example, 0 to 30% by mass, preferably 1 to 18% by mass, more preferably 2 to 15% by mass, and further preferably 3 to 8% by mass. It is preferable that 90% by mass or more of these additional components are powders with an average particle diameter of 1000 μm or less, and it is more preferable if they are powders with an average particle diameter of 500 μm or less. Furthermore, since it is difficult to perceive fine particles of 20 μm or less by human senses, it is preferable to have an average particle diameter of, for example, 20 μm or less, preferably 0.1 to 20 μm, and more preferably 1 to 12 μm, because the coarse, gritty texture of the powder disappears when it is placed in the mouth. Note that unless otherwise specified, the average particle diameter referred to in the present specification is the value measured by laser diffraction scattering (compliant with ISO 13320 and JIS Z 8825-1). Laser diffraction scattering will be described in detail later.

Note that the preferable powdered oil and/or fat composition of the present invention is preferably composed essentially of the above-mentioned oil and/or fat component alone, and the oil and/or fat component are preferably composed essentially of triglycerides alone. Also, "essentially" means that the components other than the oil and/or fat component contained in the oil and/or fat composition or the components other than the triglycerides contained in the oil and/or fat component are, for example, 0 to 15% by mass, preferably 1 to 10% by mass, and more preferably 2 to 5% by mass, when the powdered oil and/or fat composition or the oil and/or fat component is set to 100% by mass.

<Characteristics of Powdered Oil and/or Fat Composition>

The powdered oil and/or fat composition of the present invention is a powdery solid at 20° C. The powdered oil and/or fat composition of the present invention may have the following physical characteristics:

[Aggregation Degree]

The "aggregation degree" quantifies the tendency of particles to aggregate. The aggregation degree can be determined, for example, by measuring the amount of powder remaining after a certain amount of time and constant vibration on a sieve. A smaller aggregation degree indicates higher fluidity of the powder, while a larger aggregation degree indicates lower fluidity of the powder.

An example of a method for measuring the aggregation degree is to use Powder Tester PT-X (manufactured by Hosokawa Micron Corporation). Specifically, three circular sieves of 7.5 cm in diameter with different mesh sizes (upper sieve: 355 μm mesh size, middle sieve: 250 μm mesh size, lower sieve: 150 μm mesh size) are stacked, about 2 g of accurately weighed sample powder is placed on the upper sieve, and the entire stack of sieves is vibrated horizontally with an amplitude of 1 mm for a later-described vibration time T (seconds). Subsequently, the mass of the sample powder remaining on each sieve is further weighed, and the aggregation degree can be calculated from the following formula (II).

Note that the aggregation degree is measured three times for one sample, and the average value of the obtained values is taken as the aggregation degree of the sample.

$$\text{Aggregation degree } (\%)=(U/N+M/N\times\tfrac{3}{5}+L/N\times\tfrac{1}{5})\times 100 \qquad \text{(II)}$$

(In the formula, U: mass of the sample powder on the upper sieve (g), M: mass of the sample powder on the middle sieve (g), L: mass of the sample powder on the lower sieve (g), N: initial mass of the sample powder (g))

The aggregation degree of the powdered oil and/or fat composition of the present invention obtained from the above formula (II) is, for example, 0% or more and 60% or less, 55% or less, or 51% or less, and is preferably 1 to 60%, more preferably 2 to 55%, and further preferably 3 to 510%.

[Regarding Vibration Time T]

The vibration time T (seconds) used in the above measurement of aggregation degree is calculated by the following formula (III).

$$T \text{ (seconds)}=20+\{(1.6-W)/0.016\} \qquad \text{(III)}$$

Here, W represents the dynamic bulk density of the powder, which is calculated from the following formula (IV).

$$W=(Q-P)C/100+P \qquad \text{(IV)}$$

(In the formula, P: loose bulk density, Q: compact bulk density, and C: compression degree). However, when $W\geq1.6$, $T=20$.

Furthermore, the above-mentioned compact bulk density, loose bulk density, and compression degree can be determined as follows.

[Loose Bulk Density]

Loose bulk density (g/cm$^3$) refers to the mass of the powder divided by the bulk volume that powder occupies, in other words, it is the mass of the powder per unit bulk volume.

The measurement of loose bulk density can be performed using Powder Tester PT-X (manufactured by Hosokawa Micron Corporation). The measurement with Powder Tester PT-X adopts the injection method, where the measurement is conducted by letting powdered particles containing air freely fall into a container due to sinusoidal vibrations.

Specifically, powder samples are provided in a volume of 200 to 300 cm$^3$ to a circular sieve with a diameter of 7.5 cm and a mesh size of 1.7 mm. The sieve is vibrated with an amplitude of 1.5 mm, and the powder is dropped through the sieve (free fall due to sinusoidal vibration). The powder samples that free-fall from a height of 27 cm are injected into a stainless steel cup of 100 cm$^3$ (internal diameter about 5 cm×height about 5 cm) set beneath the sieve, and injection continues until the powder sample overflows from the cup, at which point the vibration of the sieve is halted. Then, using a rectangular blade, the excess powder sample on the cup is scraped off along the top surface of the cup, and the mass of the powder sample in the cup (A (g)) is measured to calculate the loose bulk density from the following formula (V).

The loose bulk density is measured three times for one sample, and its average value is taken as the value of the loose bulk density for that sample.

$$\text{Loose bulk density } (\text{g/cm}^3)=A \text{ (g)}/100 \text{ (cm}^3) \qquad \text{(V)}$$

The loose bulk density of the powdered oil and/or fat composition of the present invention is, for example, when it is composed essentially only of oil and/or fat components, 0.05 to 0.6 g/cm$^3$, preferably 0.1 to 0.5 g/cm$^3$, more preferably 0.1 to 0.4 g/cm$^3$, and further preferably 0.1 to 0.3 g/cm$^3$.

[Compact Bulk Density]

The compact bulk density (g/cm$^3$) is a bulk density determined from the density of the powder that has been further compacted by tapping the powder with a loose bulk density.

Specifically, after measuring the loose bulk density as described above, a stainless steel 100 cm$^3$ cup (inner diameter approximately 5 cm×height approximately 5 cm) is fitted with a cylindrical cap (hole diameter 5.04 cm×height 4 cm, both ends of the cylinder are open) that has a hole the same size as the cup, extending the opening of the cup. The stainless steel 100 cm$^3$ cup fitted with the cylindrical cap is placed under a circular sieve with a mesh size of 1.7 mm and a diameter of 7.5 cm. Powder samples in a volume of 200 to 300 cm$^3$ are provided to the sieve, vibrated with an amplitude of 1.5 mm, and allowed to fall through the sieve (free fall due to sinusoidal vibration). Samples that have free-fallen from a height of 27 cm are injected in sufficient quantity into the stainless steel 100 cm$^3$ cup set below, and the samples are compacted by tapping the cup 180 times (stroke 18 mm, tapping speed 60 times/minute). When tapping is carried out, the powdered particles are compacted and their volume decreases. During tapping, if the powder surface of the powdered particles drops below the top end of the cup due to the decrease in volume of the powdered particles, the sample is injected again in the same manner to the cup so that the powder surface of the powdered particle rises above the top end of the cup. After the tapping is completed, the cap is removed, and the excess sample on the cup is scraped off along the surface of the cup with a blade, and mass (B(g)) is measured to calculate the compact bulk density from the following formula (VI).

The compact bulk density is measured three times for one sample, and its average value is taken as the compact bulk density of that sample.

$$\text{Compact bulk density } (\text{g/cm}^3)=B \text{ (g)}/100 \text{ (cm}^3) \qquad \text{(VI)}$$

The compact bulk density of the powdered oil and/or fat composition of the present invention is, for example, when it is composed essentially only of oil and/or fat components, 0.1 to 2.0 g/cm$^3$, preferably 0.1 to 1.0 g/cm$^3$, more preferably 0.15 to 0.7 g/cm$^3$, and further preferably 0.2 to 0.5 g/cm$^3$.

[Compression Degree]

The compression degree C. (%) is a value obtained by the following formula (VII) using the loose bulk density P and the compact bulk density Q.

$$C\ (\%)=100\times(Q-P)/Q \qquad \text{(VII)}$$

[Repose Angle Relative Value]

The powdered oil and/or fat composition of the present invention may have a specific relative repose angle. Here, the relative repose angle refers to the ratio of the repose angle of a mixture when the powdered oil and/or fat composition is mixed with the starch of powdered potato or the like to the repose angle of the starch of powdered potato itself, and the value thus obtained is called the repose angle relative value. By confirming the relative repose angle, the improvement effect of the fluidity of starch by the powdered oil and/or fat composition can be confirmed. The repose angle relative value is specifically a value obtained by the following formula (I).

Repose angle relative value (%)=[Repose angle of
    mixed powder of the powdered oil and/or fat
    composition and powdered starch]/[Repose
    angle of powdered starch alone without the
    powdered oil and/or fat composition]×100 (I)

Here, in formula (I), "mixed powder" contains 1% by mass of the powdered oil and/or fat composition based on the total mass of the mixed powder. As "powdered starch", powdered potato starch, starch, and the like can be used. The average particle diameter of the powdered starch is, for example, 1 to 100 μm, preferably 10 to 50 μm, and more preferably 20 to 40 μm. Here, the average particle diameter means the volume average diameter [MV] measured by laser diffraction scattering (compliant with ISO 13320 and JIS Z 8825-1), as specifically explained later. In addition, the "repose angle" is defined as the angle formed with respect to the horizontal line by the free surface (the ridgeline of the mountain formed by the deposited powder) of the deposited layer of the stationary powder after the powder falls on a horizontal plane. Generally, powders with good fluidity have a smaller repose angle, and powders with poor fluidity have a larger repose angle.

Therefore, if the repose angle relative value obtained by the above formula (I) is larger than 100%, the fluidity of the mixed powder of the powdered oil and/or fat composition and powdered starch becomes worse than the fluidity of the powdered starch itself, that is, the powdered oil and/or fat composition has a negative effect on the fluidity of the powdered starch. Conversely, if the repose angle relative value is less than 100%, the fluidity of the mixed powder of the powdered oil and/or fat composition and powdered starch becomes better than the fluidity of the powdered starch itself, that is, the powdered oil and/or fat composition has improved the fluidity of the powdered starch.

The repose angle relative value of the powdered oil and/or fat composition of the present invention is, for example, 90% or less, preferably 88% or less, more preferably 86% or less, and further more preferably 84% or less. Also, the repose angle relative value of the powdered oil and/or fat composition of the present invention is, for example, 70% or more, preferably 75% or more, and more preferably 80% or more.

The measurement of the repose angle necessary for the calculation of the repose angle relative value can be performed using a testing apparatus such as Powder Tester PT-X (manufactured by Hosokawa Micron Corporation).

Specifically, 297 g of powdered potato starch (product name. Kokusan Katakuriko (Hokkai) (manufactured by Hinokuni Shokuhin Kogyo K.K.), with an average particle diameter of 34.8 μm measured by later-described laser diffraction scattering) is added with 3 g of each powder to be tested, and stirred and mixed in a food processor (product name "Food Processor 1.9 L" manufactured by Conair Japan G.K.) for 20 seconds to prepare a sample (a mixed powder containing 1% by mass of the powdered oil and/or fat composition based on the total mass).

As a control, powdered potato starch without added powdered oil and/or fat composition is stirred and mixed in the food processor in the same way as above for 20 seconds to prepare a control sample.

The repose angle for both the obtained sample and the control sample can be measured using the above-mentioned powder tester.

Specifically, the sample or control sample is provided in a volume of 200 to 300 cm³ to a circular sieve with a diameter of 7.5 cm and a mesh size of 710 μm, and vibrated with an amplitude of 1.5 mm to fall through the sieve (free fall due to sinusoidal vibration). The above sample and the like pass through a funnel with an opening diameter of 5 mm located under the sieve, and is then dropped from a height of 7.5 cm from the lower end of the funnel onto a circular table (diameter 8 cm), and is accumulated to the extent that the powder overflows from the edge of the table. Afterward, the angle formed with respect to the horizontal line by the free surface (the ridgeline of the mountain formed by the deposited powder) of the deposited layer of the powder formed by the stationary sample and the like is calculated using images, and its value is taken as the repose angle.

The repose angle is measured three times for one sample, and its average value is taken as the repose angle of that sample.

[Specific Surface Area]

The specific surface area (cm²/g) of the powdered oil and/or fat composition can be measured by the $N_2$ gas adsorption method (multipoint method).

The measurement by the $N_2$ gas adsorption method (multipoint method) can, for example, be conducted using a specific surface area measurement analysis device manufactured by Micromeritics. Specifically, one can collect 1.2 to 1.5 g of the sample into a cell, use a pretreatment device (manufactured by Micromeritics, device name "VacPrep 061") to apply a vacuum degassing treatment at room temperature (approximately 25° C.) for about 24 hours, and then measure the specific surface area using the $N_2$ gas adsorption method (multipoint method) with a specific surface area measurement analysis device (manufactured by Micromeritics, device name "3Flex"). The value of the specific surface area of the powdered oil and/or fat composition, for example, is suitably 0.5 to 10 m²/g, preferably 0.5 to 8 m²/g, more preferably 1 to 8 m²/g, and further preferably 1 to 7 m²/g.

[Shape of Powdered Oil and/or Fat Composition]

The powdered oil and/or fat composition of the present invention has a form of flake-containing particles possessing multiple flakes on the surface. The shape of these flake-containing particles has an irregular shape with unevenness surface formed due to the presence and accumulation of multiple flakes on their surfaces. Although it is unclear what the internal structure of these flake-containing particles is, as it is impossible to directly view the cross-section of the particles, judging from the electron microscope appearance photographs of the powdered oil and/or fat composition of Production Example 1 in FIG. 1 (average particle diameter 3.5 μm) and the powdered oil and/or fat composition of Production Example 4 in FIG. 2 (average particle diameter 10.5 μm), even particles from Production Example 1 that are pulverized smaller than those from Production Example 4 have multiple flakes on the surface and their appearance is almost unchanged. Therefore, it is presumed that the interior of these flake-containing particles also has a structure where multiple flakes gather.

While explanation will be given by comparing the microscope photographs of the particles and the repose angle relative values in the Examples, it is speculated that the reason the repose angle relative value of the powdered oil and/or fat composition of the present invention is 90% or less is due to this unique particle structure, although the mechanism is unclear.

The average particle diameter (effective diameter) of these particles is, for example, preferably 0.5 to 200 μm, more preferably 1 to 100 μm, further preferably 1 to 50 μm, and particularly preferably 1 to 30 μm.

Here, the average particle diameter (effective diameter) refers to the volume average diameter [MV], and a particle size distribution measuring device (for example, device name: SALD-2300 manufactured by Shimadzu Corporation) was used, based on laser diffraction scattering (ISO 13320, JIS Z 8825-1), to measure the volume-based particle size distribution by dry measurement, thereby obtaining the volume average diameter [MV], and the obtained volume average diameter [MV] was used as the average particle diameter. The volume average diameter [MV] can be calculated from the following formula using the particle diameter, the volume of the particles, and the sum of the volumes of the particles.

$$\text{Volume average diameter [MV]} = \text{sum of (particle diameter} \times \text{volume of that particle)/sum of the volumes of the particles}$$

Note that the effective diameter refers to the particle diameter of the spherical shape when the actual diffraction pattern of the crystal to be measured conforms to the theoretical diffraction pattern obtained by assuming a spherical shape. In this way, in the case of laser diffraction scattering, whether the object to be measured is plate-shaped or spherical, the effective diameter is calculated by fitting the theoretical diffraction pattern obtained by assuming a sphere and the actual diffraction pattern, so that it can be measured by the same principle.

Here, the dimensions (long side, short side, thickness) of the flake on the particle surface of the powdered oil and/or fat composition of the present invention can be determined by adopting the average values obtained by measuring their sizes from electron microscope photographs. For example, the average length of the long side of the flake is preferably 0.01 to 5 μm, more preferably 0.05 to 4 μm, further preferably 0.1 to 3 μm, and further more preferably 0.2 to 2.5 μm. The average length of the short side of the flake is shorter than the long side, and is, for example, preferably 0.01 to 4 μm, more preferably 0.05 to 3 μm, further preferably 0.1 to 2 μm, and further more preferably 0.2 to 1 μm. The average thickness of the flake is shorter than the long side and short side, and is, for example, preferably 0.005 to 0.5 μm, more preferably 0.01 to 0.3 μm, further preferably 0.02 to 0.2 μm, and further more preferably 0.03 to 0.15 μm.

<Method for Producing Powdered Oil and/or Fat Composition>

The powdered oil and/or fat composition of the present invention, for example, can be obtained by transforming the oil and/or fat components in a solid oil and/or fat composition raw material, which contains one or more XXX-type triglycerides with a fatty acid residue X having x carbon atoms at positions 1 to 3 of glycerin, into β-type oil and/or fat (preferably, the peak intensity ratio of X-ray diffraction peak is 0.6 to 1) without melting the raw material, that is, by heating to a specific temperature below the melting point according to the type of XXX-type triglyceride, and then allowing the raw materials to collide with each other for pulverization, thereby obtaining a powdered oil and/or fat composition (powdered oil and/or fat composition). Specifically, a method for producing such a powdered oil and/or fat composition can be exemplified as follows.

A method for producing a powdered oil and/or fat composition containing an oil and/or fat component that includes one or more XXX-type triglycerides with a fatty acid residue X having x carbon atoms at positions 1 to 3 of glycerin, wherein the number of carbon atoms, x, is an integer selected from 16 to 20, and the oil and/or fat component includes a β-type oil and/or fat, and the powdered oil and/or fat composition has a loose bulk density of 0.05 to 0.6 g/cm³, and preferably, in an X-ray diffraction peak of the oil and/or fat component, an intensity ratio of a peak around 4.6 Å, which is characteristic of the β-type, and a peak around 4.2 Å, which is characteristic of the α-type: [peak intensity around 4.6 Å/(peak intensity around 4.6 Å+peak intensity around 4.2 Å)] is 0.6 to 1, and preferably, an aggregation degree of the powdered oil and/or fat composition is 60% or less, the method for producing a powdered oil and/or fat composition comprising the following steps:

(a) preparing a solid oil and/or fat composition raw material containing XXX-type triglycerides;

(b) heating the solid oil and/or fat composition raw material obtained in the step (a) at a temperature below a melting point thereof, preferably avoid melting thereof, to transform the oil and/or fat component in the solid oil and/or fat composition raw material into β-type oil and/or fat (preferably, the peak intensity ratio of X-ray diffraction peak is 0.6 to 1), thereby obtaining a β-type oil and/or fat-containing composition raw material; and (c) pulverizing the β-type oil and/or fat-containing composition raw material obtained in the step (b) by collision of the raw materials without mechanical pulverization, thereby obtaining a powdered oil and/or fat composition.

Hereinafter, the steps (a) to (c) will be described.

(a) Raw Material Preparation Step

The solid oil and/or fat composition raw material containing an XXX-type triglyceride prepared in the step (a) can be produced based on the production methods of oil and/or fat such as typical XXX-type triglycerides, which contain one or more XXX-type triglycerides with a fatty acid residue X having x carbon atoms at positions 1 to 3 of glycerin, or can be easily obtained from the market. This solid oil and/or fat composition raw material can be in any form, such as powder, flake, or block. Here, the XXX-type triglycerides, identified by the aforementioned number of carbon atoms, x, and fatty acid residue X, may be the same as those of the finally obtained target powdered oil and/or fat composition or oil and/or fat components, except for crystal polymorphs. In other words, the details of terms such as XXX-type triglyceride, oil and/or fat components, and powdered oil and/or fat composition can be applied with the definition already described, excluding whether the crystal polymorph is β-type. The raw materials may include α-type oil and/or fat, β'-type oil and/or fat, or β-type oil and/or fat.

The solid oil and/or fat composition raw material may contain one or more types of the aforementioned XXX-type triglycerides, preferably one or two types, and more preferably, one type.

Specifically, for example, the above XXX-type triglycerides can be produced by direct synthesis using fatty acids or fatty acid derivatives and glycerin. As methods of direct synthesis of XXX-type triglycerides, there are: (i) the method of direct esterification of fatty acid X having x carbon atoms and glycerin (direct ester synthesis); (ii) the method of reacting glycerin and a fatty acid alkyl whose carboxyl group of fatty acid X having x carbon atoms is bound with an alkoxyl group (for example, fatty acid methyl and fatty acid ethyl) under basic or acidic catalytic conditions (interesterification synthesis using fatty acid alkyl); and (iii) the method of reacting glycerin and a fatty acid halide whose hydroxyl group of the carboxyl group of fatty acid X having x carbon atoms is replaced with halogen (for example, fatty acid chloride and fatty acid bromide) under basic catalytic conditions (acid halide synthesis).

XXX-type triglycerides can be produced by any of the above methods (i) to (iii), but from the viewpoint of ease of production, (i) direct ester synthesis or (ii) interesterification synthesis using fatty acid alkyl is preferable, and (i) direct ester synthesis is more preferable.

To produce XXX-type triglycerides via (i) direct ester synthesis, it is preferable from the viewpoint of production efficiency to use 3 to 5 moles of fatty acid X or fatty acid Y per 1 mole of glycerin, with the use of 3 to 4 moles being more preferable.

The reaction temperature in the (i) direct ester synthesis of XXX-type triglycerides may be at a temperature where the water produced by the esterification reaction can be removed from the system, for example, 120° C. to 300° C. is preferable, 150° C. to 270° C. is more preferable, and 180° C. to 250° C. is further preferable. Conducting the reaction at 180 to 250° C. allows for particularly efficient production of XXX-type triglycerides.

In the (i) direct ester synthesis of XXX-type triglycerides, a catalyst may be used to promote the esterification reaction. Examples of catalysts include acid catalysts and alkoxides of alkaline earth metals. The amount of catalyst used is preferably about 0.001 to 1% by mass based on the total mass of the reaction raw materials.

In the (i) direct ester synthesis of XXX-type triglycerides, after the reaction, the catalyst and unreacted raw materials can be removed by carrying out known purification processes such as water washing, alkali deacidification and/or vacuum deacidification, and adsorption treatment. Furthermore, by applying bleaching and deodorization treatment, the obtained reaction product can be further purified.

The amount of XXX-type triglycerides included in the solid oil and/or fat composition raw material, for example, when the total mass of all triglycerides included in the raw material or in the oil and/or fat components is taken as 100% by mass, is 100 to 50% by mass, preferably 95 to 55% by mass, and more preferably 90 to 60% by mass. It is especially preferably 85 to 65% by mass.

<Additional Triglyceride>

Additional triglycerides that can serve as the solid oil and/or fat composition raw material containing XXX-type triglycerides include various triglycerides, the effects of the present invention are not impaired. These additional triglycerides can include, for example, X2Y-type triglycerides where one of the fatty acid residues X in the XXX-type triglycerides is replaced with a fatty acid residue Y, or XY2-type triglycerides where two of the fatty acid residues X in the XXX-type triglycerides are replaced with a fatty acid residue Y.

The amount of these additional triglycerides, for example, when the total mass of all triglycerides is set to 100% by mass, can be 0 to 50% by mass, preferably 5 to 45% by mass, more preferably 10 to 40% by mass, and especially preferably 15 to 35% by mass.

In addition, instead of directly synthesizing the aforementioned XXX-type triglycerides, it is permissible to use materials that have been subjected to hydrogenation, interesterification, or fractionation of naturally derived triglyceride compositions as the solid oil and/or fat composition raw material according to the present invention. Examples of naturally derived triglyceride compositions include rapeseed oil, soybean oil, sunflower oil, high-oleic sunflower oil, safflower oil, palm stearin, and mixtures thereof. In particular, hardened oils, partially hardened oils, and extremely hardened oils of these naturally derived triglyceride compositions can be noted as preferable. Further preferably, hard palm stearin, extremely hardened high-oleic sunflower oil, rapeseed extremely hardened oil, and extremely hardened soybean oil can be mentioned, and further more preferably, it is rapeseed extremely hardened oil.

Furthermore, as the solid oil and/or fat composition raw material of the present invention, commercially available triglyceride compositions or synthetic oil and/or fat can be mentioned. For example, as triglyceride compositions, hard palm stearin (manufactured by Nisshin Oillio Group, Ltd.), rapeseed extremely hardened oil (manufactured by Yokozeki Yushi Kogyo K.K.), and soybean extremely hardened oil (manufactured by Yokozeki Yushi Kogyo K.K.) can be mentioned. Additionally, as synthetic oils and/or fats, tripalmitin (manufactured by Tokyo Chemical Industry Co., Ltd.), tristearin (manufactured by Sigma-Aldrich), tristearin (manufactured by Tokyo Chemical Industry Co., Ltd.), and triarachidin (manufactured by Tokyo Chemical Industry Co., Ltd.) can be mentioned.

<Additional Component>

In addition to the aforementioned triglycerides, the solid oil and/or fat composition raw material can optionally include additional components such as partial glycerides, fatty acids, antioxidants, emulsifiers, water, and other solvents. The amount of these additional components can be any amount as long as the effects of the present invention are not impaired, but for example, when the total mass of the oil and/or fat composition raw material is set to 100% by mass, it may be 0 to 5% by mass, preferably 0 to 2% by mass, and more preferably 0 to 1% by mass.

The solid oil and/or fat composition raw material may be mixed arbitrarily if it includes multiple components. Any known mixing method may be used as long as a homogeneous reaction substrate can be obtained. For example, it can be done with a paddle mixer, agi homo mixer, disper mixer, V-type mixer, W-type mixer, ribbon mixer, or the like.

(b) Step of Transforming to β-Type Oil and/or Fat

Before step (c), the crystal polymorph of the oil and/or fat component in the solid oil and/or fat composition raw material prepared in the step (a) is transformed to β-type oil and/or fat (preferably, the peak intensity ratio of X-ray diffraction peak is 0.6 to 1).

In the step of transforming to β-type oil and/or fat, whether the oil and/or fat component has changed to include β-type oil and/or fat can be determined from the intensity ratio of the β-type characteristic peaks and α-type characteristic peaks in the X-ray diffraction peaks: [Intensity of β-type characteristic peak/(Intensity of α-type characteristic peak+Intensity of β-type characteristic peak)] (peak intensity ratio).

Specifically, based on the aforementioned knowledge of X-ray diffraction measurements, an index representing the abundance of β-type oil and/or fat in the oil and/or fat components is calculated by the ratio of the peak intensity at $2\theta=19°$ (4.6 Å), a characteristic peak of the β-type, to the peak intensity at $2\theta=21°$ (4.2 Å), a characteristic peak of the α-type: peak intensity around 19°/(peak intensity around 19°+peak intensity at 21°) [peak intensity around 4.6 Å/(peak intensity around 4.6 Å+peak intensity around 4.2 Å)]. From this, it can be understood to "include β-type oil and/or fat".

In other words, if this peak intensity ratio is 0, it is understood that all is α-type oil and/or fat, and if the peak intensity ratio is 1, it is understood that all is β-type oil and/or fat, and further, if the peak intensity ratio is a number close to 1, it is understood that there is a larger amount of β-type oil and/or fat. Ideally, in the present invention, all of the oil and/or fat components are β-type oil and/or fat (that is, peak intensity ratio=1).

Therefore, in the step of transforming to β-type oil and/or fat, the treatment is performed so that the peak intensity ratio of the oil and/or fat component becomes preferably 0.6 to 1, more preferably 0.7 to 1, further preferably 0.8 to 1, further more preferably 0.9 to 1, and particularly preferably, 0.95 to 1.

The method for transforming to β-type oil and/or fat involves heating the solid oil and/or fat composition raw material obtained in the step (a) at a temperature below the melting point, without melting it. The "melting point" mentioned here means the melting point of the oil and/or fat composition raw material, and more preferably the melting point of the oil and/or fat component in the oil and/or fat composition raw material. It is important not to melt the oil and/or fat composition raw material, that is, to transform to β-type oil and/or fat without melting the oil and/or fat component. The heating temperature is preferably kept constant throughout the heating step. Here, "constant" means, for example, controlling the temperature change to within ±3° C., preferably ±1° C., and more preferably ±0.5° C.

Moreover, heating is suitably performed at a temperature where the oil and/or fat component in the solid oil and/or fat composition raw material does not melt throughout the heating step.

The step of transforming the solid oil and/or fat composition raw material to β-type oil and/or fat by heating can be performed by putting the solid oil and/or fat composition raw material in a constant temperature bath and leaving it standing, or it can be performed by heating while stirring the raw material, for example, with a machine such as a horizontal agitator tank, that is, under non-standing conditions. The method of heating under non-standing conditions has the advantage of shortening the time to transform to β-type oil and/or fat, thereby increasing production efficiency.

For example, the heating temperature is suitably 1 to 30° C. lower than the melting point of the solid oil and/or fat composition raw material containing oil and/or fat components including one or more XXX-type triglycerides with a fatty acid residue X having x carbon atoms at positions 1 to 3 of glycerin, preferably 2 to 27° C. lower than the melting point, more preferably 3 to 23° C. lower than the melting point, and further more preferably 3 to 19° C. lower than the melting point.

For example, in the case of XXX-type triglyceride with three stearic acid residues each having 18 carbon atoms, the melting point of β-type oil and/or fat is 74° C. (Table 1), so that the heating temperature is preferably 1 to 30° C. lower than the melting point (that is, 44 to 73° C.), more preferably 2 to 27° C. lower than the melting point (that is, 47 to 72° C.), further preferably 3 to 23° C. lower than the melting point (that is, 51 to 71° C.), and further more preferably 3 to 19° C. lower than the melting point (that is, 55 to 71° C.).

Furthermore, in the case of the above XXX-type triglyceride having 16 carbon atoms, the heating temperature is preferably 36 to 65° C., and more preferably 39 to 64° C. In the case where it has 20 carbon atoms, the heating temperature is preferably 48 to 77° C., and more preferably 51 to 76° C.

For instance, in the case of flake-like rapeseed extremely hardened oil with a melting point of 67° C., the heating temperature is suitably set to a temperature 1 to 30° C. lower than the melting point (that is, 37 to 66° C.), preferably 2 to 27° C. lower than the melting point (that is, 40 to 65° C.), more preferably 3 to 23° C. lower than the melting point (that is, 44 to 64° C.), and further preferably 3 to 19° C. lower than the melting point (that is, 48 to 64° C.).

As for the heating time, it suffices that it is long enough to transform into β-type oil and/or fat. For example, 10 minutes or more, preferably 20 minutes to 120 hours, more preferably 30 minutes to 100 hours, and further preferably 30 to 72 hours are suitable.

Step (b) can be performed with the solid oil and/or fat composition raw material in a standing state, or a non-standing state.

For heating in a standing state, methods such as heating the solid oil and/or fat composition raw material in a constant temperature chamber or constant temperature bath can be mentioned. To shorten the heating time during heating in the standing state, it is preferable to heat the raw material so that heat is transmitted throughout. To achieve such a situation, it would be beneficial to reduce the height of the raw material accumulated during heating. For example, a method can be applied where the solid oil and/or fat composition raw material is spread and laid out in a stainless container of 10 to 100 cm in length, 10 to 100 cm in width, and 5 to 30 cm in height so that the height of accumulation is reduced, and then heated in a constant temperature chamber or constant temperature bath. Note that if there is no need to shorten the heating time, there is no need to reduce the height of the raw material accumulated.

The heating time when heating in a standing state is not particularly limited, as long as it is long enough to transform the oil and/or fat components to β-type oil and/or fat. For example, it is suitable that the time is preferably 20 minutes or more, more preferably 30 minutes to 120 hours, further preferably 10 to 100 hours, and further more preferably 15 to 72 hours. If the height of the accumulated solid oil and/or fat composition raw material to be heat-treated is reduced so that heat is quickly transmitted to the entire raw material, it is possible to transform to β-type oil and/or fat in a short time. However, if the height of the raw material accumulated is high and the heat transmission to the entire raw material is slow, longer heating time will be necessary.

The method of heating in a non-standing state, for example, involves heating a solid oil and/or fat composition raw material while stirring it using a horizontal agitator tank or the like.

The heating time when heating in a standing state is not particularly limited, as long as it is long enough to transform the oil and/or fat components to β-type oil and/or fat. For example, it is suitable that the heating time is 10 minutes or more, 15 minutes or more, or 20 minutes or more, and the upper limit thereof is preferably 5 hours or less, and more preferably 2 hours or less. A shorter heating time is preferable, as it improves the efficiency of the operation and the like.

(c) Step of Pulverizing by Collision of Raw Materials to Obtain Powdered Oil and/or Fat Composition The β-type oil and/or fat-containing composition raw materials obtained from the aforementioned step (b) can be pulverized by collision with each other using an airflow pulverizer or the like that does not involve mechanical pulverization, thereby obtaining a powdered oil and/or fat composition.

The pulverization by collision of raw materials can be achieved using an airflow pulverizer or the like that does not involve mechanical pulverization. "Mechanical pulverization" means pulverization conducted mechanically with pulverization tools such as impellers or hammers installed in cyclone mills or hammer mills. The phrase "does not involve mechanical pulverization" is interpreted as not performing mechanical pulverization simultaneously during the "pulverization by collision of raw materials". In the present invention, while it is permissible to crush the raw materials obtained in the step (b) with a crusher as an initial step of pulverization, and to perform mechanical pulverization, the pulverization immediately prior to obtaining the final powdered oil and/or fat composition is appropriately only conducted by making the raw materials collide with each other, during which, no mechanical pulverization is performed. Here, "airflow pulverization" is a method of pulverizing the target to be pulverized by using an airflow, such as compressed air, to cause the pulverization target objects in motion due to this airflow to collide with each other. Unlike the method of mechanically pulverizing the pulverization target, since the pulverization targets collide with each other, it is possible to obtain finer particles without altering surface characteristics, such as smoothing of the particle surface due to hammer faces, and the like. Additionally, by using an airflow pulverizer equipped with a classifier, it is possible to obtain particles with the desired particle diameter. Examples of "airflow pulverizers" include fluidized bed jet mills and counter jet mills, and more specific examples of airflow pulverizer include the "Counter Jet Mill 200AFG" pulverizer manufactured by Hosokawa Micron Corporation, among others, can be mentioned.

For example, when using the aforementioned counter jet mill, the classification speed can be set, for instance, to 1800 to 12000 rpm. The higher the classification speed, the smaller the average particle diameter of the obtained powdered oil and/or fat composition tends to be, thus, by changing the classification speed, it is possible to adjust the average particle diameter of the obtained particles.

Step (c) is appropriately the step immediately prior to obtaining the final powdered oil and/or fat composition. As long as, eventually, the raw materials are made to collide with each other, followed by pulverize to obtain the final powdered oil and/or fat composition without mechanical pulverization, crushing may be performed with a crusher or the like before pulverization with an airflow pulverizer. Additionally, the pulverization of the oil and/or fat composition raw materials that have been transformed to β-type oil and/or fat by heating may be conducted after cooling the product temperature to room temperature (25° C.±5° C.).

<Applications of Powdered Oil and/or Fat Composition>

The powdered oil and/or fat composition of the present invention can be used in various fields that use powdered oil and/or fat as raw materials. Specifically, it can be used in the food sector, such as for bread, sweets, cake mixes, noodles, dusting flour, batter, tempura flour, fried chicken flour, powdered starch, and powdered potato starch. Additionally, the powdered oil and/or fat composition of the present invention can be used as a powder fluidity improver to enhance the fluidity of powdered foods and the like.

<Foods and Non-Foods Containing Oil and/or Fat Composition>

The content of powdered oil and/or fat composition in food of the present invention varies depending on the type of food targeted. For example, if considering the entirety of the food finally obtained as 100% by mass, it is 0.1 to 99% by mass, preferably 0.1 to 90% by mass, more preferably 0.5 to 80% by mass, and further preferably 1 to 70% by mass. The food of the present invention can be produced using known methods, apart from using the powdered oil and/or fat composition of the present invention as a raw material. When powdered foods are used, the average particle diameter of those powdered foods is, for example, 1 to 100 μm, preferably 10 to 50 μm, and more preferably 20 to 40 μm. Furthermore, these can also be utilized in non-food powdered products similarly to the aforementioned foods.

<Powder Fluidity Improver>

The powdered oil and/or fat composition used in the present invention can be used as a powder fluidity improver to enhance the fluidity of powders. For example, by adding the powdered oil and/or fat composition used in the present invention as part of the ingredients of powdered food such as starch, it is possible to improve the fluidity of conventional powdered food. The improvement in fluidity can be confirmed, for example, by aggregation degree or the repose angle relative value. Preferable aggregation degree and repose angle relative value are as described above.

The powder fluidity improver of the present invention may contain the aforementioned powdered oil and/or fat composition as an active ingredient. In addition to this, it may also contain other components, such as dextrin, excipients such as starch, emulsifiers, and the like, as long as the effects of the present invention are not impaired.

The powder fluidity improver of the present invention contains the above-mentioned powdered oil and/or fat composition. The powder fluidity improver of the present invention preferably contains 50 to 100% by mass, more preferably 80 to 100% by mass, and further preferably 90 to 100% by mass, of the abovementioned powdered oil and/or fat composition.

Note that a preferable powder fluidity improver of the present invention is preferably composed essentially of the powdered oil and/or fat composition alone. Also, "essentially" means that the components other than the powdered oil and/or fat composition contained in the powder fluidity improver are, for example, 0 to 10% by mass, preferably 0 to 5% by mass, and more preferably 0 to 3% by mass, when the powder fluidity improver is set to 100% by mass.

Moreover, the amount of the powder fluidity improver of the present invention added to powdered food (such as starch) is preferably 0.05 to 20% by mass, more preferably 0.08 to 10% by mass, and further preferably 0.1 to 5% by mass.

EXAMPLES

Next, the present invention will be described in detail with Production Examples and Production Comparative Examples.

[Analysis Method]

Hereinafter, various analysis methods used are explained. While some of them are explained taking Production Example 1 for illustration, unless otherwise specified, the same analyses were performed for all Production Examples and Production Comparative Examples described here.

Triglyceride Composition

The triglyceride composition was determined by gas chromatography analysis. The measurement conditions are indicated below.

Gas Chromatography Analysis Conditions

DB1-ht (0.32 mm×0.1 μm×5 m) by Agilent Technologies Inc. (123-1131)

Injection volume: 1.0 μL

Injector: 370° C.

Detector: 370° C.

Split ratio: 50/1 at 35.1 kPa constant pressure

Column CT: 200° C. (0 min hold) to (15° C./min) to 370° C. (4 min hold)

X-Ray Diffraction Measurement

Measurements were made using an X-ray diffractometer (Rigaku Corporation, fully automatic multi-purpose X-ray diffractometer Smart Lab 9 kW) under the conditions of CuKα (λ=1.542 Å) as a source, a Cu filter, an output of 9.0 kW, operating angles of 0.96 to 30.0°, and a measurement speed of 20°/min. This measurement confirmed the presence of α-type oil and/or fat, β'-type oil and/or fat, and β-type oil and/or fat in the oil and/or fat components containing XXX-type triglycerides. If only a peak around 4.6 Å is present and there is no peak around 4.1 to 4.2 Å, it can be judged that all of the oil and/or fat components are β-type oil and/or fat.

Therefore, based on the results of the above X-ray diffraction measurements, the peak intensity ratio=[Intensity of β-type characteristic peak (2θ=19° (4.6 Å))/(Intensity of α-type characteristic peak (2θ=21° (4.2 Å))+Intensity of β-type characteristic peak (2θ=19° (4.6 Å)))] was calculated, and this value was judged as an indicator of the abundance of β-type oil and/or fat.

Aggregation Degree

The aggregation degree was measured using Powder Tester PT-X (manufactured by Hosokawa Micron Corporation).

Specifically, three circular sieves of 7.5 cm in diameter, with different mesh sizes selected based on bulk density (upper sieve: mesh size 355 μm, middle sieve: mesh size 250 μm, lower sieve: mesh size 150 μm), were stacked and about 2 g of the powdered oil and/or fat composition from Production Example 1 was placed on the top sieve, and the entire stack was then vibrated horizontally for a vibration time of 106 seconds at an amplitude of 1 mm. Subsequently, the mass of the remaining powdered oil and/or fat composition from Production Example 1 on each sieve was weighed, and the aggregation degree was calculated using the following formula (II). Note that the aggregation degree was measured three times for one sample of powder (powdered oil and/or fat composition from Production Example 1), and the average value was used as the aggregation degree for the powdered oil and/or fat composition from Production Example 1.

$$\text{Aggregation degree (\%)}=(U/N+M/N\times\tfrac{2}{3}+L/N\times\tfrac{1}{3})\times 100 \qquad (II)$$

(In the formula, U: mass of the sample powder on the upper sieve (g), M: mass of the sample powder on the middle sieve (g), L: mass of the sample powder on the lower sieve (g), N: initial mass of the sample powder (g))

Note that the calculation of vibration time (T (seconds)) was carried out using the methods described in the formula (III) and formula (IV) in the [Description of Embodiments].

$$T \text{ (seconds)}=20+\{(1.6-W)/0.016\} \qquad (III)$$

(W represents the dynamic bulk density of the powder, which is calculated from the following formula (IV))

$$W=(Q-P)C/100+P \qquad (IV)$$

(In the formula, P: loose bulk density, Q: compact bulk density, and C: compression degree). However, when $W \geq 1.6$, $T=20$.

Loose Bulk Density

Loose bulk density (g/cm³) was determined as the mass of the powder divided by the bulk volume that powder occupies, in other words, it is the mass of the powder per unit bulk volume.

The measurement of loose bulk density was performed using Powder Tester PT-X (manufactured by Hosokawa Micron Corporation). The measurement with Powder Tester PT-X adopted the injection method, where the measurement was conducted by letting powdered particles containing air freely fall into a container due to sinusoidal vibrations.

Specifically, powder samples were provided in a volume of 200 to 300 cm³ to a circular sieve with a diameter of 7.5 cm and a mesh size of 1.7 mm. The sieve was vibrated with an amplitude of 1.5 mm, and the powder was dropped through the sieve (free fall due to sinusoidal vibration). The powder samples that free-fell from a height of 27 cm were injected into a stainless steel cup of 100 cm³ (internal diameter about 5 cm×height about 5 cm) set beneath the sieve, and injection continued until the powder sample overflowed from the cup, at which point the vibration of the sieve was halted. Then, using a rectangular blade, the excess powder sample on the cup was scraped off along the top surface of the cup, and the mass of the powder sample in the cup (A (g)) was measured to calculate the loose bulk density from the following formula (V). Note that the loose bulk density was measured three times for one sample, and its average value was taken as the value of the loose bulk density for that sample.

$$\text{Loose bulk density (g/cm}^3)=A \text{ (g)}/100 \text{ (cm}^3) \qquad (V)$$

Compact Bulk Density

After measuring the loose bulk density, a stainless steel 100 cm³ cup (inner diameter approximately 5 cm×height approximately 5 cm) was fitted with a cylindrical cap (hole diameter 5.04 cm×height 4 cm, both ends of the cylinder were open) that had a hole the same size as the cup, extending the opening of the cup. The stainless steel 100 cm³ cup fitted with the cylindrical cap was placed under a circular sieve with a mesh size of 1.7 mm and a diameter of 7.5 cm. Powder samples in a volume of 200 to 300 cm³ were provided to the sieve, vibrated with an amplitude of 1.5 mm, and allowed to fall through the sieve (free fall due to sinusoidal vibration). Samples that had free-fallen from a height of 27 cm were injected in sufficient quantity into the stainless steel 100 cm³ cup set below, and the samples were compacted by tapping the cup 180 times (stroke 18 mm, tapping speed 60 times/minute). When tapping was carried out, the powdered particles were compacted and their volume decreased. During tapping, if the powder surface of the powdered particles dropped below the top end of the cup due to the decrease in volume of the powdered particles, the sample was injected again in the same manner to the cup so that the powder surface of the powdered particle rose above the top end of the cup. After the tapping was completed, the cap was removed, and the excess sample on the cup was scraped off along the surface of the cup with a blade, and mass (B(g)) was measured to calculate the compact bulk density from the following formula (VI).

The compact bulk density was measured three times for one sample, and its average value was taken as the compact bulk density of that sample.

$$\text{Compact bulk density (g/cm}^3) = B \text{ (g)}/100 \text{ (cm}^3) \tag{VI}$$

Compression Degree

The compression degree C. (%) was determined by the following formula (VII) using the loose bulk density P and the compact bulk density Q described above.

$$C \text{ (\%)} = 100 \times (Q - P)/Q \tag{VII}$$

Repose Angle Relative Value

Powdered potato starch in an amount of 297 g (product name: Kokusan Katakuriko (Hokkai) (manufactured by Hinokuni Shokuhin Kogyo K.K.), with an average particle diameter of 34.8 μm measured by later-described laser diffraction scattering) was added with 3 g of the powdered oil and/or fat composition from Production Example 1 (containing 10% by mass of the powdered oil and/or fat composition based on the total mass) to prepare a mixed powder, and this mixed powder was stirred and mixed in a food processor (product name "Food Processor 1.9 L" manufactured by Conair Japan G.K.) for 20 seconds to prepare a sample. In place of the powdered oil and/or fat composition from Production Example 1, samples with added powdered oil and/or fat compositions from Production Examples 2 to 4 and Production Comparative Examples 1 to 9 were prepared in the same manner.

As a control, powdered potato starch itself without added powdered oil and/or fat composition was stirred and mixed in the food processor in the same way for 20 seconds to prepare a control sample.

The repose angle for the obtained samples was measured using Powder Tester PT-X (manufactured by Hosokawa Micron Corporation).

Specifically, a powdered sample was provided in a volume of 200 to 300 cm³ to a circular sieve with a diameter of 7.5 cm and a mesh size of 1.7 mm, and vibrated with an amplitude of 1.5 mm to fall through the sieve (free fall due to sinusoidal vibration). The powdered sample passed through a funnel with an opening diameter of 5 mm located under the sieve, and was then dropped from a height of 7.5 cm onto a circular table (diameter 8 cm), and was accumulated to the extent that the powder overflowed from the edge of the table. The angle formed with respect to the horizontal line by the free surface of the deposited layer of the powder formed was calculated using images, and its value was taken as the repose angle.

The repose angle was measured three times for one sample, and its average value was taken as the repose angle of that sample.

Next, the values of repose angles measured were used to determine the repose angle relative value from the following formula (I).

Repose angle relative value (%)=[Repose angle of mixed powder of the powdered oil and/or fat composition and powdered potato starch]/[Repose angle of powdered potato starch alone without the powdered oil and/or fat composition]×100 (I)

(in formula (I), "mixed powder" contains 1% by mass of the powdered oil and/or fat composition based on the total mass of the mixed powder).

Specific Surface Area

The specific surface area (cm²/g) of the powdered oil and/or fat composition was measured by the $N_2$ gas adsorption method (multipoint method).

Specifically, we collected 1.2 to 1.5 g of the sample into a cell, used a pretreatment device (manufactured by Micromeritics, device name "VacPrep 061") to apply a vacuum degassing treatment at room temperature (25° C.) for 24 hours, and then measured the specific surface area using the $N_2$ gas adsorption method (multipoint method) with a specific surface area measurement analysis device (manufactured by Micromeritics, device name "3Flex").

Average Particle Diameter

Regarding the average particle diameter, a particle size distribution measuring device (device name: SALD-2300 manufactured by Shimadzu Corporation) was used, based on laser diffraction scattering (ISO 13320, JIS Z 8825-1), to measure the volume-based particle size distribution by dry measurement, thereby obtaining the volume average diameter [MV], and the obtained volume average diameter [MV] was used as the average particle diameter. The volume average diameter [MV] was calculated from the following formula using the particle diameter, the volume of the particles, and the sum of the volumes of the particles.

Volume average diameter [MV]=sum of (particle diameter×volume of that particle)/sum of the volumes of the particles Observation of Appearance The appearance of the various obtained powdered oil and/or fat compositions was visually observed. Moreover, the shape of the particles of the powdered oil and/or fat compositions was observed at a magnification of 10000 times using an electron microscope ("JSM-7500F" manufactured by JEOL Ltd.).

The method for depositing the sample to be observed with an electron microscope is described below.

First, after laying conductive tape on a copper plate and placing the sample powder thereon, a blower treatment with nitrogen gas was conducted to blow off excess sample. Subsequently, the deposition treatment was performed using an osmium plasma coater ("OPC-80" manufactured by Nippon Laser & Electronics Lab.), carrying out an osmium deposition treatment (30 nm).

Size of Flakes Present on Surface of Powdered Oil and/or Fat Composition Particles The size of the flakes present on the surface of the powdered oil and/or fat composition particles obtained in Production Examples 1 to 4 and Production Comparative Example 1 was measured using the aforementioned electron microscope photographs.

The long side (μm), short side (μm), and thickness (μm) of the flakes captured in the electron microscope photographs were each measured. The measurement was carried out for 10 flakes and their average value was determined.

Raw Material

The details of the flake-shaped rapeseed extremely hardened oil, which was used as a raw material in the Production Examples and Production Comparative Examples, are as follows.

Manufactured by Yokozeki Yushi Kogyo K.K., α-type oil and/or fat, in the case where the total mass of rapeseed extremely hardened oil is 100% by mass, the content of XXX-type triglyceride with a fatty acid residue X (stearic acid residue) having 18 carbon atoms at positions 1 to 3 of glycerin is 79.6% by mass, peak intensity ratio: 0.03, melting point 67° C.

Production Examples 1 to 4 (Constant Temperature Chamber, Counter Jet Mill)

Flaked-shaped rapeseed extremely hardened oil in an amount of 20 kg was placed in a paper bag (vertical: 800 mm, horizontal 450 mm, thickness: 150 mm) and inserted into a constant temperature chamber (width: 5100 mm×height: 2100 mm×depth: 4050 mm, manufactured by ESPEC Corporation, device name "TBUU") and left standing for 64 hours at 62° C., where no melting occurs, to obtain flak-shaped oil and/or fat.

The obtained flak-shaped oil and/or fat, 12.0 kg, was crushed with a crusher to obtain an oil and/or fat crushed product. The resulting oil and/or fat crushed product, 6.0 kg, was pulverized with an airflow pulverizer (manufactured by Hosokawa Micron Corporation, device name "Counter Jet Mill 200AFG") by collision of the raw materials, yielding 4.8 kg of powdered oil and/or fat composition (the content of XXX-type triglyceride with a fatty acid residue X (stearic acid residue) having 18 carbon atoms at positions 1 to 3 of glycerin was 79.6% by mass when the total mass of the powdered oil and/or fat composition was set to 100% by mass). Note that Production Examples 1 to 4 are produced by the same method except for different classification speeds during pulverization, as shown in table 2. X-ray diffraction analysis confirmed that the crystal polymorphism of the oil and/or fat in the obtained powdered oil and/or fat compositions of Production Examples 1 to 4 was β-type. Table 2 shows the pulverization conditions of the airflow pulverizer, the appearance and analysis values of each sample, and the crystal polymorphism of the oil and/or fat in each powdered oil and/or fat composition confirmed by X-ray diffraction analysis.

Figure 2:
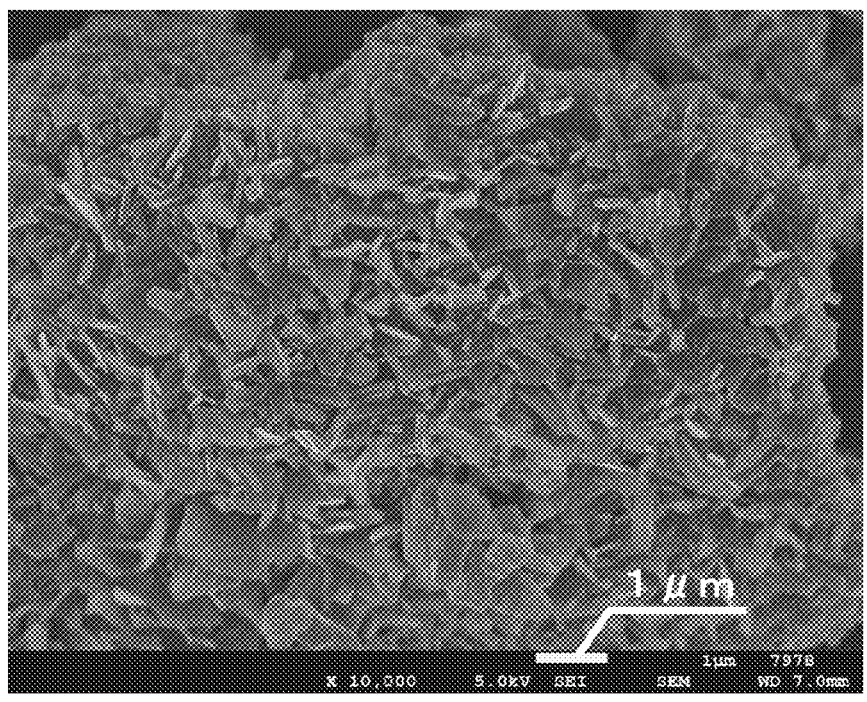
FIG. 2 is a microscopic appearance photograph of the powdered oil and/or fat composition (β-type oil and/or fat) from Production Example 4.

Example 1 are shown in FIG. 1, and electron microscope photographs of Production Example 4 are shown in FIG. 2.

Production Example 5 (β-Treatment Only, Constant Temperature Chamber)

The β-treatment of α-type oil and/or fat was examined using a constant temperature chamber.

Specifically, 6 kg of flake-shaped rapeseed extremely hardened oil was spread and laid out in a stainless steel container (width: 530 mm×depth: 325 mm×height: 200 mm), and placed inside a steel rack (width: 760 mm×depth: 460 mm×height: 1795 mm) within the constant temperature chamber (width: 5100 mm×height: 2100 mm×depth: 4050 mm, manufactured by ESPEC Corporation, device name "TBUU"), and was then subjected to a heating treatment for 28 days at 40° C., to thereby obtain 6 kg of the heat-treated, flake-shaped oil and/or fat (the content of XXX-type triglyceride with a fatty acid residue X (stearic acid residue) having 18 carbon atoms at positions 1 to 3 of glycerin was 79.6% by mass when the total mass of the powdered oil and/or fat composition was set to 100% by mass).

X-ray diffraction analysis confirmed that the crystal polymorphism of the heat-treated, flake-shaped oil and/or fat was β-type. Table 3 shows the heating method, appearance, analysis values, and the crystal polymorphism of the oil and/or fat confirmed by X-ray diffraction analysis.

Production Example 6 (β-Treatment Only, Constant Temperature Chamber)

The β-treatment of α-type oil and/or fat was examined using a constant temperature chamber.

Specifically, 6 kg of flake-shaped rapeseed extremely hardened oil was spread and laid out in a stainless steel container (width: 530 mm×depth: 325 mm×height: 200 mm), and placed inside a steel rack (width: 760 mm×depth:

TABLE 2

| | Pulverization Conditions of Airflow Pulverizer and Analysis Value of Each Sample | | | | |
|---|---|---|---|---|---|
| | | Production Example 1 | Production Example 2 | Production Example 3 | Production Example 4 |
| Pulverization Condition | Classification Speed (rpm) | 11500 | 8000 | 5000 | 1800 |
| | Common Pulverization Conditions | Diameter of nozzle used × number: 5.0 mm × 3 | | | |
| | | Amount supplied: 6 kg | | | |
| | | Pulverization air flow rate (theoretical value): 4.81 Nm³/min | | | |
| | | Pulverization air pressure: 0.60 MPa | | | |
| Appearance | Visual Appearance | Fine Powder | | | |
| | Particle Shape by Electron Microscopy | Irregular shapes with uneven surfaces formed due to the presence and accumulation of multiple flakes on their surfaces | | | |
| Analysis Value | Average Particle Diameter (μm) | 3.5 | 4.2 | 6.0 | 10.5 |
| | Specific Surface Area (m²/g) | 5.8 | 5.2 | 4.0 | 3.0 |
| | Loose Bulk Density (g/cm³) | 0.15 | 0.16 | 0.19 | 0.23 |
| | Compact Bulk Density (g/cm³) | 0.28 | 0.29 | 0.33 | 0.41 |
| | Peak Intensity Ratio | 0.98 | 0.98 | 0.98 | 0.98 |
| | Average Value of Long Side (μm) | 0.5 | 0.7 | 0.6 | 0.7 |
| | Average Value of Short Side (μm) | 0.3 | 0.4 | 0.3 | 0.3 |
| | Average Value of Thickness (μm) | 0.06 | 0.06 | 0.07 | 0.06 |
| Crystal Polymorphism of Oil and/or Fat in Powdered Oil and/or Fat Composition | | β-type | β-type | β-type | β-type |

Upon observing the powdered oil and/or fat composition particles from Production Examples 1 to 4 using an electron microscope based on the aforementioned appearance observations, it was found that these particles were irregularly shaped with uneven surfaces formed due to the presence and accumulation of multiple flakes on their surfaces. For reference, the electron microscope photographs of Production 460 mm×height: 1795 mm) within the constant temperature chamber (width: 5100 mm×height: 2100 mm×depth: 4050 mm, manufactured by ESPEC Corporation, device name "TBUU"), and was then subjected to a heating treatment for 15 hours at 62° C., to thereby obtain 6 kg of the heat-treated, flake-shaped oil and/or fat (the content of XXX-type triglyceride with a fatty acid residue X (stearic acid residue)

having 18 carbon atoms at positions 1 to 3 of glycerin was 79.6% by mass when the total mass of the powdered oil and/or fat composition was set to 100% by mass).

X-ray diffraction analysis confirmed that the crystal polymorphism of the heat-treated, flake-shaped oil and/or fat was β-type. Table 3 shows the heating method, appearance, analysis values, and the crystal polymorphism of the oil and/or fat confirmed by X-ray diffraction analysis.

Production Example 7 (β-Treatment Only, Horizontal Agitator Tank)

The β-treatment of α-type oil and/or fat was examined using a horizontal agitator tank.

Specifically, 4.0 kg of flake-shaped rapeseed extremely hardened oil was heat-treated for 30 minutes at 63° C. at a stirring speed of 100 rpm using a horizontal agitator tank (manufactured by Matsubo Corporation, device name "Lodige Mixer M20"), to thereby obtain 3.8 kg of flaky oil and/or fat (the content of XXX-type triglyceride with a fatty acid residue X (stearic acid residue) having 18 carbon atoms at positions 1 to 3 of glycerin was 79.6% by mass when the total mass of the powdered oil and/or fat composition was set to 100% by mass). X-ray diffraction analysis confirmed that the crystal polymorphism of the heat-treated, flake-shaped oil and/or fat was β-type. Table 3 shows the heating method, appearance, analysis values, and the crystal polymorphism of the oil and/or fat confirmed by X-ray diffraction analysis.

Production Example 8 (β-Treatment Only, Horizontal Agitator Tank)

The β-treatment of α-type oil and/or fat was examined using a horizontal agitator tank.

Specifically, 4.0 kg of flake-shaped rapeseed extremely hardened oil was heat-treated for 1 hour at 65° C. at a stirring speed of 50 rpm using a horizontal agitator tank (manufactured by Matsubo Corporation, device name "Lodige Mixer M20"), to thereby obtain 3.8 kg of flaky oil and/or fat (the content of XXX-type triglyceride with a fatty acid residue X (stearic acid residue) having 18 carbon atoms at positions 1 to 3 of glycerin was 79.6% by mass when the total mass of the powdered oil and/or fat composition was set to 100% by mass). X-ray diffraction analysis confirmed that the crystal polymorphism of the heat-treated, flake-shaped oil and/or fat was β-type. Table 3 shows the heating method, appearance, analysis values, and the crystal polymorphism of the oil and/or fat confirmed by X-ray diffraction analysis.

From the results in Table 3, it was found that α-type oil and/or fat could be transformed into β-type oil and/or fat without melting the raw material by heat treatment at temperatures of 40° C. to 65° C. Moreover, as can be seen from Production Examples 5 and 6, and Production Examples 7 and 8, when comparing the heating times using the same heating device, a trend was observed that the higher the heating temperature, the shorter the time to transform into β-type oil and/or fat. Furthermore, it was found that heating the raw material to be heated in a non-standing state, stirred state as in Production Examples 7 and 8 could shorten the time to transform into β-type oil and/or fat compared to heating the raw material to be heated in a standing state as with Production Examples 5 and 6.

Production Comparative Example 1 (Without β-Treatment, Counter Jet Mill)

Flak-shaped rapeseed extremely hardened oil, 12.0 kg, was crushed with a crusher to obtain 11.5 kg of oil and/or fat crushed product. The resulting oil and/or fat crushed product, 6.0 kg, was pulverized with an airflow pulverizer (manufactured by Hosokawa Micron Corporation, device name "Counter Jet Mill 200AFG"), yielding 4.8 kg of powdered oil and/or fat composition (the content of XXX-type triglyceride with a fatty acid residue X (stearic acid residue) having 18 carbon atoms at positions 1 to 3 of glycerin was 79.6% by mass when the total mass of the powdered oil and/or fat composition was set to 100% by mass). X-ray diffraction analysis confirmed that the crystal polymorphism of the oil and/or fat in the obtained powdered oil and/or fat compositions was α-type and β-type.

Note that in Production Comparative Example 1, no heat treatment was performed, but it is considered that part of the α-type oil and/or fat was transformed to 0-type oil and/or fat due to the heat or the like generated during pulverization by the airflow pulverizer.

Table 4 shows the pulverization conditions of the airflow pulverizer, the appearance and analysis values of the samples, and the crystal polymorphism of the oil and/or fat in the powdered oil and/or fat compositions confirmed by X-ray diffraction analysis.

TABLE 3

| Heating Method and Analysis Value of Each Sample | | Production Example 5 | Production Example 6 | Production Example 7 | Production Example 8 |
|---|---|---|---|---|---|
| Heating Method | Heating Device | Constant Temperature Chamber | Constant Temperature Chamber | Horizontal Agitator Tank | Horizontal Agitator Tank |
| | State of Raw Material during Heating | Standing State | Standing State | Stirring State | Stirring State |
| | Heating Temperature | 40° C. | 62° C. | 63° C. | 65° C. |
| | Heating Time | 28 Days | 15 Hours | 30 Minutes | 1 Hour |
| Appearance | Visual Appearance | Flaked | Flaked | Flaked | Flaked |
| Analysis Value | Peak Intensity Ratio | 0.90 | 0.99 | 0.99 | 0.99 |
| Crystal Polymorphism of Oil and/or Fat in Powdered Oil and/or Fat Composition | | β-type | β-type | β-type | β-type |

TABLE 4

Pulverization Conditions of Airflow Pulverizer and Analysis Values of Samples
Production Comparative Example 1

| | | |
|---|---|---|
| Pulverization Condition | Diameter of nozzle used × number: 5.0 mm × 3 | |
| | Classification speed: 8000 rpm | |
| | Amount supplied: 6 kg | |
| | Pulverization air flow rate (theoretical value): 4.81 Nm³/min | |
| | Pulverization air pressure: 0.60 MPa | |
| Appearance | Visual Appearance | Fine powder, but some particles were aggregated. |
| | Particle Shape by Electron Microscopy | Irregular shapes with uneven surfaces formed due to the presence and accumulation of multiple flakes on their surfaces |
| Analysis Value | Average Particle Diameter (μm) | 6.0 |
| | Specific Surface Area (m²/g) | 5.1 |
| | Loose Bulk Density (g/cm³) | 0.19 |
| | Compact Bulk Density (g/cm³) | 0.30 |
| | Peak Intensity Ratio | 0.55 |
| | Average Value of Long Side (μm) | 0.6 |
| | Average Value of Short Side (μm) | 0.4 |
| | Average Value of Thickness (μm) | 0.06 |
| Crystal Polymorphism of Oil and/or Fat in Powdered Oil and/or Fat Composition | | α-type and β-type |

Figure 3:
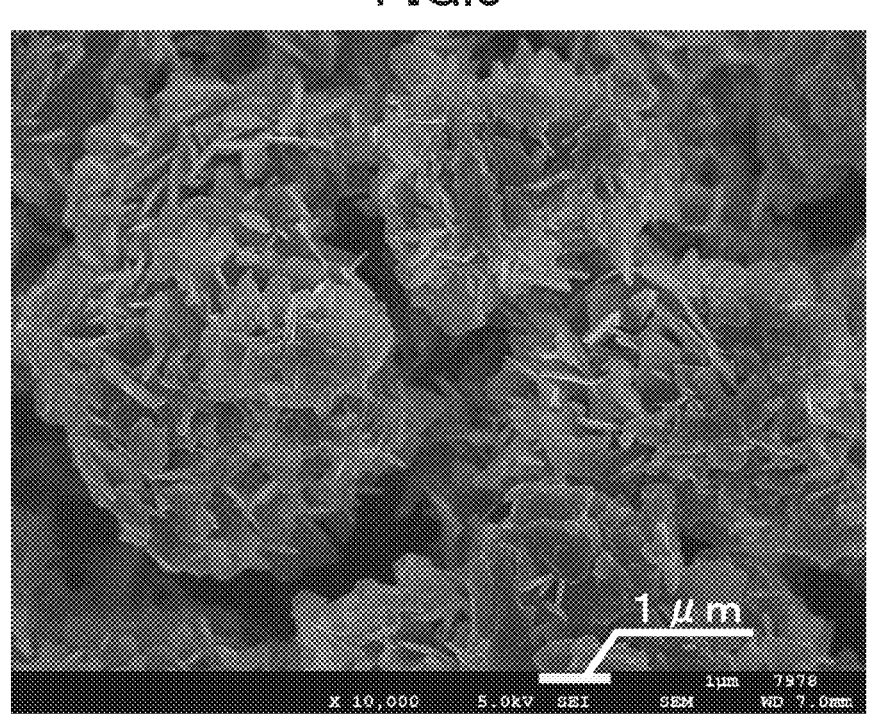
FIG. 3 is a microscopic appearance photograph of the powdered oil and/or fat composition (α-type and β-type oil and/or fat) from Production Comparative Example 1.

Upon observing the powdered oil and/or fat composition particles from Production Comparative Example 1 using an electron microscope based on the aforementioned appearance observations, it was found that these particles were irregularly shaped with uneven surfaces formed due to the presence and accumulation of multiple flakes on their surfaces. For reference, the electron microscope photographs of Production Comparative Example 1 are shown in FIG. 3.

Production Comparative Example 2 (Constant Temperature Chamber, Cyclone Mill (Mechanical and Airflow Pulverizer))

6.0 kg of flake-shaped rapeseed extremely hardened oil was spread and laid out in a stainless steel container (width: 530 mm×depth: 325 mm×height: 200 mm), and placed inside a steel rack (width: 760 mm×depth: 460 mm×height: 1795 mm) within the constant temperature chamber (width: 5100 mm×height: 2100 mm×depth: 4050 mm, manufactured by ESPEC Corporation, device name "TBUU"), and was then subjected to a cycle of 66° C. for 4 hours and then 63° C. for 4 hours three times, to thereby obtain flake-shaped oil and/or fat.

The obtained flak-shaped oil and/or fat, 6.0 kg, was crushed with a crusher to obtain an oil and/or fat crushed product.

Next, 4.0 kg of the obtained oil and/or fat crushed product were pulverized using a mechanical and airflow pulverizer (manufactured by Shizuoka-Plant K.K., device name "Cyclone Mill 150BMS") to obtain 3.5 kg of powdered oil and/or fat composition. Here, the Cyclone Mill is a pulverizer that combines three functions: mechanical pulverization by an impeller, airflow pulverization due to collisions between particles in high-speed airflow, and centrifugal classification. To further reduce the particle diameter of the powdered oil and/or fat composition, 1.3 kg of the obtained powdered oil and/or fat composition was pulverized again using the mechanical and airflow pulverizer (manufactured by Shizuoka-Plant K.K., device name "Cyclone Mill 150BMS") to obtain 1.0 kg of powdered oil and/or fat composition (the content of XXX-type triglyceride with a fatty acid residue X (stearic acid residue) having 18 carbon atoms at positions 1 to 3 of glycerin was 79.6% by mass when the total mass of the powdered oil and/or fat composition was set to 100% by mass). X-ray diffraction analysis confirmed that the crystal polymorphism of the oil and/or fat in the obtained powdered oil and/or fat compositions was β-type. Table 5 shows the pulverization conditions of the mechanical and airflow pulverizer, the appearance and analysis values of the samples, and the crystal polymorphism of the oil and/or fat in the powdered oil and/or fat compositions confirmed by X-ray diffraction analysis.

TABLE 5

Pulverization Conditions of Mechanical and Airflow
Pulverizer and Analysis Values of Samples
Production Comparative Example 2

| | | |
|---|---|---|
| Pulverization Condition | 1st Time | Impeller rotation speed: 6600 rpm |
| | | Inter-impeller distance: 25 mm |
| | | Blower rotation speed: 60 Hz |
| | 2nd Time | Impeller rotation speed: 7000 rpm |
| | | Inter-impeller distance: 48 mm |
| | | Blower rotation speed: 50 Hz |
| Appearance | Visual Appearance | Fine Powder |
| | Particle Shape by Electron Microscopy | Irregular shape with no flakes on the particle surfaces, and irregular shape with uneven surface formed due to the presence of multiple flakes on the surfaces |

TABLE 5-continued

Pulverization Conditions of Mechanical and Airflow
Pulverizer and Analysis Values of Samples
Production Comparative Example 2

| Analysis | Average Particle Diameter (μm) | 43.6 |
|---|---|---|
| Value | after First Pulverize | |
| | Average Particle Diameter (μm) | 10.9 |
| | after Second Pulverize | |
| | Specific Surface Area (m²/g) | 2.7 |
| | Loose Bulk Density (g/cm³) | 0.27 |
| | Compact Bulk Density (g/cm³) | 0.45 |
| | Peak Intensity Ratio | 0.99 |
| Crystal Polymorphism of Oil and/or Fat in | | β-type |
| Powdered Oil and/or Fat Composition | | |

Observing the powdered oil and/or fat composition particles from Production Comparative Example 2 using an electron microscope based on the aforementioned appearance observations revealed the presence of some irregular-shaped particles with no flakes on the surface, as well as the presence of particles having irregular shapes with uneven surfaces formed due to the presence and accumulation of multiple flakes on their surfaces.

Figure 4:
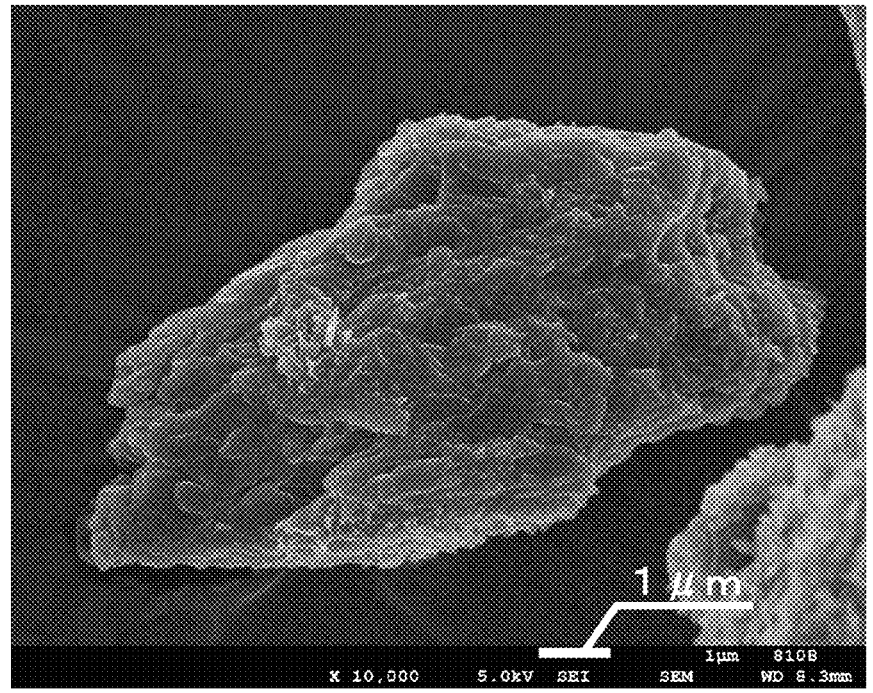
FIG. 4 is a microscopic photograph of the powdered oil and/or fat composition (β-type oil and/or fat) from Production Comparative Example 2.

Meanwhile, during the pulverization with Cyclone Mill, not only were there irregularly shaped particles with unevenness surfaces formed due to the presence of multiple flakes on their surfaces, but also irregularly shaped particles with no flakes on the particle surfaces were present (FIG. 4). The reason for the presence of these irregularly shaped particles with no flakes on the particle surfaces is, in the pulverization with Cyclone Mill, considered to be the simultaneous mechanical pulverization by impellers, in addition to the airflow pulverization due to the collision of particles in high-speed airflow, causing the surface flakes to be crushed and disappear.

From this, it has been understood that to produce a powdered oil and/or fat composition having irregular shapes with uneven surfaces formed due to the presence and accumulation of multiple flakes on their surfaces, it is necessary for the production to use a pulverizer that does not perform mechanical pulverization in the pulverization step immediately before obtaining the final powdered oil and/or fat composition, for example, an airflow pulverizer.

Production Comparative Examples 3 to 7 (Melting Followed by Solidification, Counter Jet Mill)

2 kg of flake-shaped rapeseed extremely hardened oil was spread and laid out in a stainless steel container (width: 530 mm×depth: 325 mm×height: 100 mm), and a total of 6 stainless containers were placed inside a steel rack (width: 760 mm×depth: 460 mm×height: 1795 mm) within the constant temperature chamber (width: 5100 mm×height: 2100 mm×depth: 4050 mm, manufactured by ESPEC Corporation, device name "TBUU"), and the temperature was maintained at 80° C., above the melting point, for 10 hours until complete melting. Afterward, it was cooled at 60° C. for 15 hours to form a solid with increased volume and voids. Once crystallization was complete, it was cooled down to room temperature (25° C.) to obtain an oil and/or fat solid matter.

The obtained oil and/or fat solid matter, 12.0 kg, was crushed with a crusher to obtain an oil and/or fat crushed product. Next, the resulting oil and/or fat crushed product, 10.0 kg, was pulverized with an airflow pulverizer (manufactured by Hosokawa Micron Corporation, device name "Counter Jet Mill 200AFG"), yielding 7.8 kg of powdered oil and/or fat composition (the content of XXX-type triglyceride with a fatty acid residue X (stearic acid residue) having 18 carbon atoms at positions 1 to 3 of glycerin was 79.4% by mass when the total mass of the powdered oil and/or fat composition was set to 100% by mass). X-ray diffraction analysis confirmed that the crystal polymorphism of the oil and/or fat in the obtained powdered oil and/or fat compositions was β-type. Table 6 shows the pulverization conditions of the airflow pulverizer, the appearance and analysis values of the samples, and the crystal polymorphism of the oil and/or fat in the powdered oil and/or fat compositions confirmed by X-ray diffraction analysis.

TABLE 6

| | Pulverization Conditions of Airflow Pulverizer and Analysis Value of Each Sample | Production Comparative Example 3 | Production Comparative Example 4 | Production Comparative Example 5 | Production Comparative Example 6 | Production Comparative Example 7 |
|---|---|---|---|---|---|---|
| Pulverization Condition | Classification Speed (rpm) | 11500 | 8000 | 5000 | 3000 | 1800 |
| | Common Pulverization Conditions | Diameter of nozzle used × number: 5.0 mm × 3 | | | | |
| | | Amount supplied: 10 kg | | | | |
| | | Pulverization air flow rate (theoretical value): 4.81 Nm³/min | | | | |
| | | Pulverization air pressure: 0.60 MPa | | | | |
| Appearance | Visual Appearance | Fine Powder | | | | |
| | Particle Shape by Electron Microscopy | Plate-Shaped | | | | |
| Analysis | Average Particle Diameter (μm) | 2.9 | 3.6 | 5.0 | 6.7 | 7.9 |
| Value | Specific Surface Area (m²/g) | 5.1 | 4.4 | 3.7 | 3.1 | 3.1 |
| | Loose Bulk Density (g/cm³) | 0.11 | 0.14 | 0.15 | 0.18 | 0.19 |

TABLE 6-continued

| Pulverization Conditions of Airflow Pulverizer and Analysis Value of Each Sample | | | | | |
| --- | --- | --- | --- | --- | --- |
| | Production Comparative Example 3 | Production Comparative Example 4 | Production Comparative Example 5 | Production Comparative Example 6 | Production Comparative Example 7 |
| Compact Bulk Density (g/cm³) | 0.23 | 0.27 | 0.31 | 0.36 | 0.38 |
| Peak Intensity Ratio | 0.99 | 0.99 | 0.99 | 0.99 | 0.99 |
| Crystal Polymorphism of Oil and/or Fat in Powdered Oil and/or Fat Composition | β-type | β-type | β-type | β-type | β-type |

Figure 5:
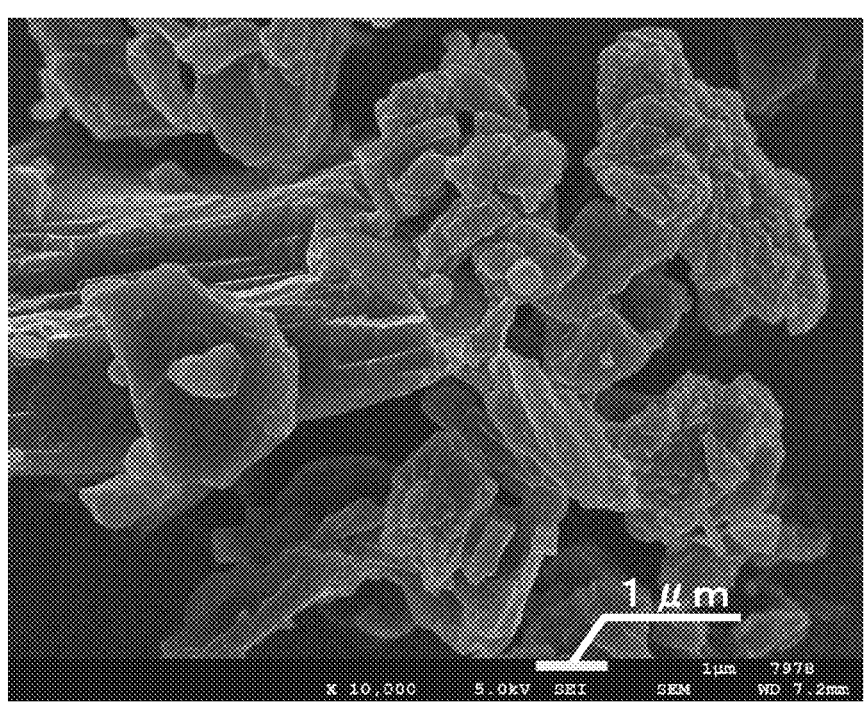
FIG. 5 is a microscopic photograph of the powdered oil and/or fat composition (β-type oil and/or fat) from Production Comparative Example 5.

Upon observing the powdered oil and/or fat composition particles from Production Comparative Examples 3 to 7 using an electron microscope based on the aforementioned appearance observations, it was found that the particles were simply plate shaped, not irregularly shaped with uneven surfaces formed due to the presence and accumulation of multiple flakes on their surfaces. For reference, the electron microscope photographs of Production Comparative Example 5 are shown in FIG. 5.

Production Comparative Example 8 (Constant Temperature Chamber, Cyclone Mill (Mechanical and Airflow Pulverizer))

2.0 kg of flake-shaped rapeseed extremely hardened oil was spread and laid out in a stainless steel container (width: 530 mm×depth: 325 mm×height: 100 mm), and a total of 3 stainless containers were placed inside a steel rack (width: 760 mm×depth: 460 mm×height: 1795 mm) within the constant temperature chamber (width: 5100 mm×height: 2100 mm×depth: 4050 mm, manufactured by ESPEC Corporation, device name "TBUU"), and the temperature was maintained at 80° C., above the melting point, for 10 hours until complete melting. Afterward, it was cooled at 60° C. for 16 hours to form a solid with increased volume and voids. Once crystallization was complete, it was cooled down to room temperature (25° C.) to obtain an oil and/or fat solid matter.

The obtained oil and/or fat solid matter, 6.0 kg, was crushed with a crusher to obtain an oil and/or fat crushed product.

Next, the resulting oil and/or fat crushed product, 5.8 kg, was pulverized with a mechanical and airflow pulverizer (manufactured by Shizuoka-Plant K.K., device name "Cyclone Mill 150BMS"), yielding 5.4 kg of powdered oil and/or fat composition (the content of XXX-type triglyceride with a fatty acid residue X (stearic acid residue) having 18 carbon atoms at positions 1 to 3 of glycerin was 79.4% by mass when the total mass of the powdered oil and/or fat composition was set to 100% by mass).

Here, the Cyclone Mill is a pulverizer that combines three functions: mechanical pulverization by an impeller, airflow pulverization due to collisions between particles in high-speed airflow, and centrifugal classification.

X-ray diffraction analysis confirmed that the crystal polymorphism of the oil and/or fat in the obtained powdered oil and/or fat compositions was β-type.

Table 7 shows the pulverization conditions of the mechanical and airflow pulverizer, the appearance and analysis values of the samples, and the crystal polymorphism of the oil and/or fat in the powdered oil and/or fat compositions confirmed by X-ray diffraction analysis.

TABLE 7

| Pulverization Conditions of Mechanical and Airflow Pulverizer and Analysis Values of Samples Production Comparative Example 8 | | |
| --- | --- | --- |
| Pulverization Condition | Impeller rotation speed: 6600 rpm Inter-impeller distance: 25 mm Blower rotation speed: 60 Hz | |
| Appearance | Visual Appearance | Fine Powder |
| | Particle Shape by Electron Microscopy | Plate-Shaped |
| Analysis | Average Particle Diameter (μm) | 11.1 |
| Value | Specific Surface Area (m²/g) | 2.6 |
| | Loose Bulk Density (g/cm³) | 0.19 |
| | Compact Bulk Density (g/cm³) | 0.39 |
| | Peak Intensity Ratio | 0.99 |
| Crystal Polymorphism of Oil and/or Fat in Powdered Oil and/or Fat Composition | β-type | |

Figure 6:
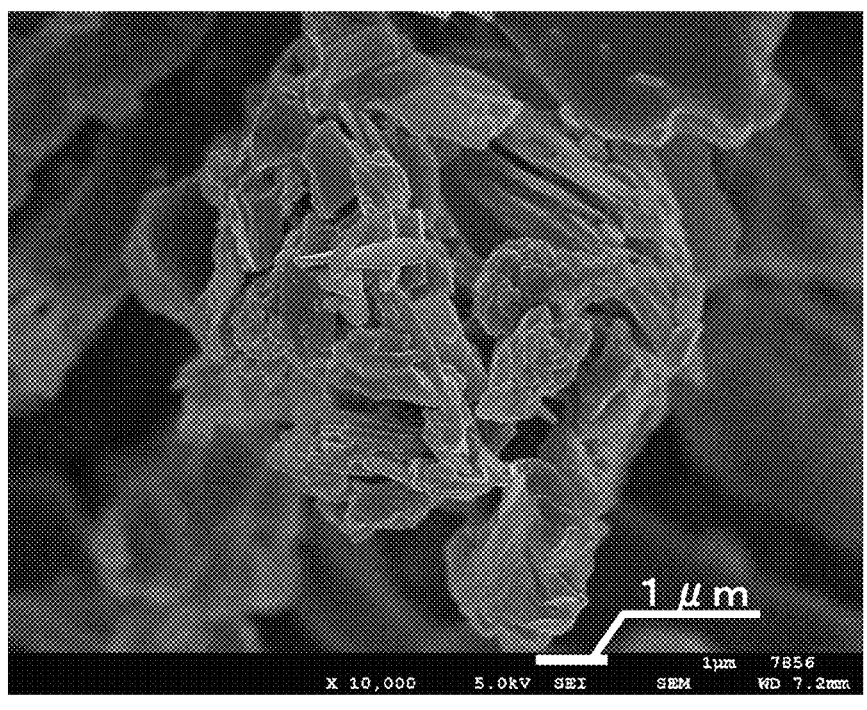
FIG. 6 is a microscopic photograph of the powdered oil and/or fat composition (β-type oil and/or fat) from Production Comparative Example 8.

Upon observing the powdered oil and/or fat composition particles from Production Comparative Example 8 using an electron microscope based on the aforementioned appearance observations, it was found that the particles were simply plate shaped, not irregularly shaped with uneven surfaces formed due to the presence and accumulation of multiple flakes on their surfaces. For reference, the electron microscope photographs of Production Comparative Example 8 are shown in FIG. 6.

Production Comparative Example 9 (Melting Followed by Crystallization, Mechanical Pulverizer)

2.0 kg of flake-shaped rapeseed extremely hardened oil was spread and laid out in a stainless steel container (width: 530 mm×depth: 325 mm×height: 100 mm), and a total of 3 stainless containers were placed inside a steel rack (width: 760 mm×depth: 460 mm×height: 1795 mm) within the constant temperature chamber (width: 5100 mm×height: 2100 mm×depth: 4050 mm, manufactured by ESPEC Corporation, device name "TBUU"), and the temperature was maintained at 80° C., above the melting point, for 10 hours until complete melting. Afterward, it was cooled at 60° C. for 16 hours to form a solid with increased volume and voids. Once crystallization was complete, it was cooled down to room temperature (25° C.) to obtain an oil and/or fat solid matter.

The obtained oil and/or fat solid matter, 6.0 kg, was crushed with a crusher to obtain an oil and/or fat crushed product.

Figure 8:
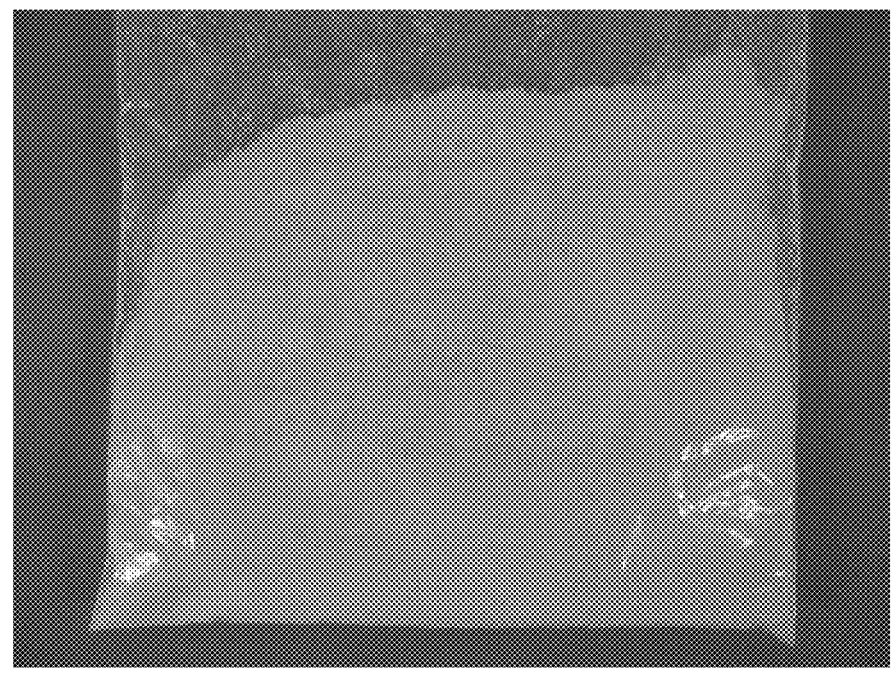
FIG. 8 is an appearance photograph after storing Production Example 1 in a constant temperature bath at 40° C. for 5 days.
Figure 9:
FIG. 9 is an appearance photograph after storing Production Comparative Example 1 in a constant temperature bath at 40° C. for 5 days.
Figure 10:
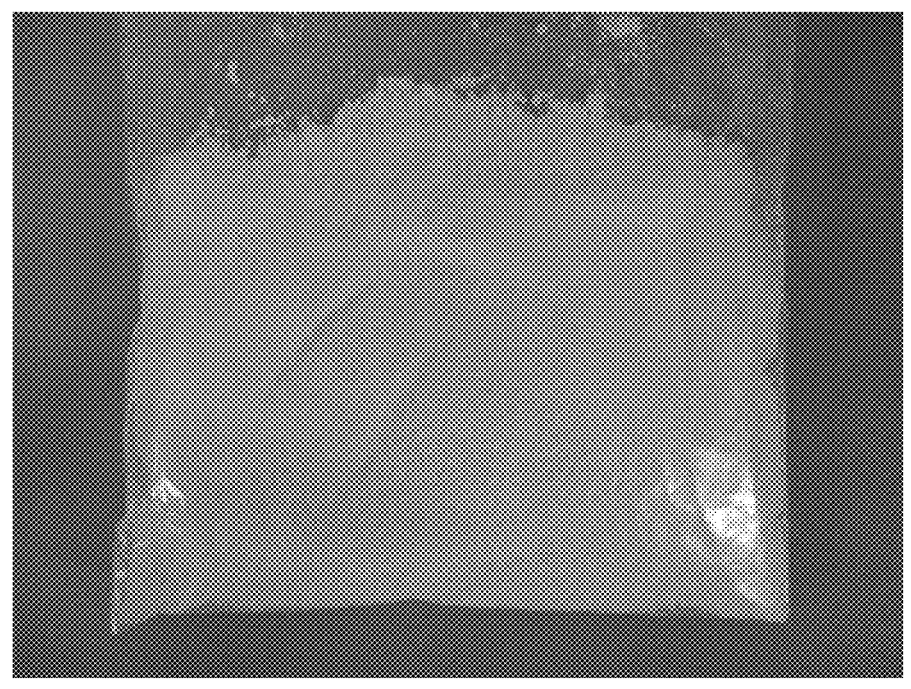
FIG. 10 is an appearance photograph after storing Production Comparative Example 4 in a constant temperature bath at 40° C. for 5 days.

Next, the resulting oil and/or fat crushed product, 5.8 kg, was pulverized with a fine pulverizer with a built-in impact-type classifier as a mechanical pulverizer (manufactured by Hosokawa Micron Corporation, device name "ACM-10A"), yielding 5.5 kg of powdered oil and/or fat composition (the content of XXX-type triglyceride with a fatty acid residue X (stearic acid residue) having 18 carbon atoms at positions 1 to 3 of glycerin was 79.4% by mass when the total mass of the powdered oil and/or fat composition was set to 100% by mass). X-ray diffraction analysis confirmed that the crystal polymorphism of the oil and/or fat in the obtained powdered oil and/or fat compositions was β-type. Table 8 shows the appearance was observed (FIGS. 8 to 10). In addition, Storage Stability Test 2 was also conducted in the same manner, where the storage conditions were changed from "5 days at 40° C." to "5 months at 20° C.". The results of Storage Stability Tests 1 and 2 are shown in Table 9.

TABLE 9

| Storage Stability Test Results (5 days at 40° C., 5 months at 20° C.) | | | | |
|---|---|---|---|---|
| | | Production Example 1 | Production Comparative Example 1 | Production Comparative Example 4 |
| Crystal Polymorphism of Oil and/or Fat in Powdered Oil and/or Fat Composition at Start of Storage | | β-type | α-type + β-type | β-type |
| Appearance | Before Storage | Powdery | Powdery | Powdery |
| | After storage at 40° C. for 5 days | Powdery | Blocking (powder aggregation) occurred, resulting in large lumps | Powdery |
| | Drawing (40° C.) | FIG. 8 | FIG. 9 | FIG. 10 |
| | After storage at 20° C. for 5 months | Powdery | Some blocking (aggregation of powder) occurred | Powdery | pulverization conditions of the fine pulverizer with a built-in impact-type classifier, the appearance and analysis values of the samples, and the crystal polymorphism of the oil and/or fat in the powdered oil and/or fat compositions confirmed by X-ray diffraction analysis.

TABLE 8

| Pulverization Conditions of Fine Pulverizer with Built-In Impact-Type Classifier and Analysis Values of Samples Production Comparative Example 9 | | |
|---|---|---|
| Pulverization Condition | Pulverizer rotation speed: 6000 rpm Classification rotation speed: 1500 rpm | |
| Appearance | Visual Appearance | Fine Powder |
| | Particle Shape by Electron Microscopy | Plate-Shaped |
| Analysis Value | Average Particle Diameter (μm) | 16.6 |
| | Specific Surface Area (m²/g) | 2.1 |
| | Loose Bulk Density (g/cm³) | 0.21 |
| | Compact Bulk Density (g/cm³) | 0.43 |
| | Peak Intensity Ratio | 0.98 |
| Crystal Polymorphism of Oil and/or Fat in Powdered Oil and/or Fat Composition | | β-type |

Figure 7:
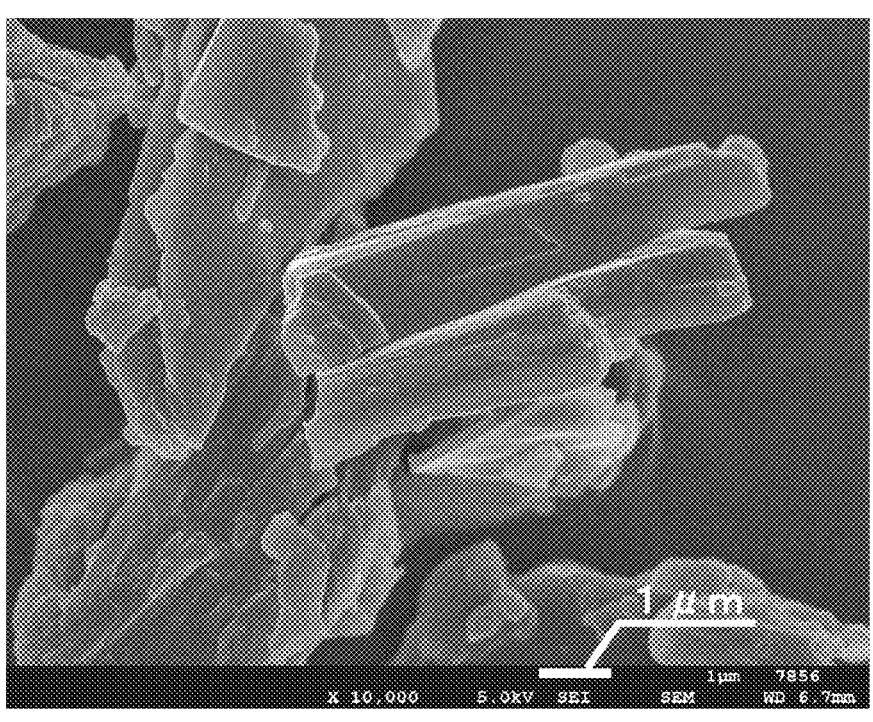
FIG. 7 is a microscopic photograph of the powdered oil and/or fat composition (β-type oil and/or fat) from Production Comparative Example 9.

Upon observing the powdered oil and/or fat composition particles from Production Comparative Example 9 using an electron microscope based on the aforementioned appearance observations, it was found that the particles were simply plate shaped, not irregularly shaped with uneven surfaces formed due to the presence and accumulation of multiple flakes on their surfaces. For reference, the electron microscope photographs of Production Comparative Example 9 are shown in FIG. 7.

[Storage Stability Test at 40° C. and 20° C.]

The powdered oil and/or fat composition containing α-type and β-type oil and/or fat obtained in Production Comparative Example 1, as well as the powdered oil and/or fat compositions containing β-type oil and/or fat obtained in Production Example 1 and Production Comparative Example 4, were subjected to Storage Stability Test 1 at 40° C. Specifically, about 100 g of each sample was placed in a polyethylene vinyl bag and stored in a constant temperature bath at 40° C. (in the dark) for 5 days, after which the From Table 9, when each powdered oil and/or fat composition was stored at 40° C. for 5 days, the powdered oil and/or fat compositions of Production Example 1 and Production Comparative Example 4, which are β-type oils and/or fats, showed no changes in appearance (FIGS. 8 and 10), but the powdered oil and/or fat composition of Production Comparative Example 1, containing α-type and β-type oils and/or fats (FIG. 9), experienced blocking (aggregation of powder), resulting in large lumps.

Also, when each powdered oil and/or fat composition was stored at 20° C. for 5 months (long-term storage), the powdered oil and/or fat compositions of Production Example 1 and Production Comparative Example 4, which are β-type oils and/or fats, showed no changes in appearance, but the powdered oil and/or fat composition of Production Comparative Example 1, containing α-type and β-type oils and/or fats, experienced some blocking (aggregation of powder).

From the above, the powdered oil and/or fat composition of Production Comparative Example 1, containing α-type and β-type oils and/or fats, was considered to have no commercial value as it showed poor storage stability at both 40° C. for 5 days and 20° C. for 5 months.

[Repose Angle Relative Value Test]

Tables 10 to 12 show the repose angle relative values for powdered potato starch added with 1% by mass of the powdered oil and/or fat compositions from Production Examples 1 to 4 and Production Comparative Examples 1 to 9.

Furthermore, Table 13 shows the repose angle relative values for powdered potato starch added with 1% by mass of the powdered oil and/or fat compositions from Production Example 1 and Production Comparative Example 4, after being stored for 5 months at 20° C.

TABLE 10

| Aggregation Degree and repose Angle Relative Value | | | | |
| --- | --- | --- | --- | --- |
| Powder Added | Production Example 1 | Production Example 2 | Production Example 3 | Production Example 4 |
| Pulverizer | | Airflow Pulverizer | | |
| Average Particle Diameter (μm) | 3.5 | 4.2 | 6.0 | 10.5 |
| Aggregation Degree (%) | 50.5 | 37.0 | 24.2 | 9.6 |
| Repose Angle Relative Value (%) of Powdered Potato Starch | 86.3 | 85.1 | 85.7 | 82.1 |

TABLE 11

| Aggregation Degree and repose Angle Relative Value | | | | | |
| --- | --- | --- | --- | --- | --- |
| | Production Comparative Example 1 | Production Comparative Example 2 | Production Comparative Example 3 | Production Comparative Example 4 | Production Comparative Example 5 |
| Pulverizer | Airflow Pulverizer | Mechanical and Airflow Pulverizer | Airflow Pulverizer | | |
| Average Particle Diameter (μm) | 6.0 | 10.9 | 2.9 | 3.6 | 5.0 |
| Aggregation Degree (%) | 51.9 | 25.9 | 73.3 | 82.1 | 71.9 |
| Repose Angle Relative Value (%) of Powdered Potato Starch | 89.1 | 96.8 | 89.9 | 92.6 | 92.6 |

TABLE 12

| Aggregation Degree and repose Angle Relative Value | | | | |
| --- | --- | --- | --- | --- |
| | Production Comparative Example 6 | Production Comparative Example 7 | Production Comparative Example 8 | Production Comparative Example 9 |
| Pulverizer | Airflow Pulverizer | | Mechanical and Airflow Pulverizer | Mechanical Pulverizer |
| Average Particle Diameter (μm) | 6.7 | 7.9 | 11.1 | 16.6 |
| Aggregation Degree (%) | 70.9 | 68.9 | 66.0 | 78.4 |
| Repose Angle Relative Value (%) of Powdered Potato Starch | 94.5 | 95.1 | 95.0 | 93.0 |

TABLE 13

| Repose Angle Relative Value (Stored at 20° C. for 5 Months after Production) | | |
| --- | --- | --- |
| Powder Added | Production Example 1 | Production Comparative Example 1 |
| Pulverizer | Airflow Pulverizer | |
| Repose Angle Relative Value (%) of Powdered Potato Starch | 86.9 | 97.6 |

From Tables 10 to 12, the aggregation degree of the powdered oil and/or fat compositions of Production Examples 1 to 4 was all 60% or less, whereas the aggregation degree of the powdered oil and/or fat compositions of Production Comparative Examples 3 to 9 was 66% or more, and it was therefore found that the powdered oil and/or fat compositions of Production Examples 1 to 4 had higher powder fluidity than the powdered oil and/or fat compositions of Production Comparative Examples 3 to 9.

Therefore, since the powdered oil and/or fat composition of the present invention is a powder with good handling properties, it is considered to be easy to handle during the production of the powdered oil and/or fat composition; moreover, when adding the powdered oil and/or fat composition to other components to produce a powder mixture, it is considered that the efficiency of the production operation of such powder mixture will be improved.

Additionally, the repose angle relative values of powdered potato starch with the added powdered oil and/or fat compositions of Production Examples 1 to 4 were all 90% or less, while the repose angle relative values of powdered potato starch with the added powdered oil and/or fat compositions of Production Comparative Examples 2 and 4 to 9 were greater than 90%. From this, it was found that the powdered oil and/or fat composition of the present invention could improve the fluidity of powders such as starch when added to them.

The mechanism is unclear, but judging from the shape of the particles in FIGS. 1 to 7, the difference in repose angle relative values may be attributed to the fact that: the particles of the powdered oil and/or fat composition of Production Examples 1 and 4 of the present invention (FIGS. 1 and 2), as well as Production Comparative Example 1 (FIG. 3), have a form of flake-containing particles possessing multiple flakes on the surface; in contrast, the powdered oil and/or fat composition of Production Comparative Example 2 not only contains irregularly shaped particles with uneven surfaces formed due to the presence of multiple flakes on their surfaces but also particles with irregular shapes without flakes on their particle surfaces (FIG. 4); and furthermore, the powdered oil and/or fat compositions of Production Comparative Examples 5, 8, and 9 have flat-shaped particles without flakes on their particle surfaces (FIGS. 5 to 7).

Moreover, as can be seen from Tables 10 and 13, the repose angle relative value (86.9%, Table 13) of powdered potato starch, added with the powdered oil and/or fat composition of Production Example 1 and stored at 20° C. for 5 months (long-term storage), hardly changed from the repose angle relative value before storage (86.3%, Table 10).

Meanwhile, as can be seen from Table 11, the powdered oil and/or fat composition of Production Comparative Example 1, which contains α-type and β-type oil and/or fat before storage, had an aggregation degree of 60% or less, and the repose angle relative value of the powdered potato starch, added with the powdered oil and/or fat composition, was 90% or less (89.1%). On the other hand, as can be seen from Table 13, the repose angle relative value of the powdered potato starch, added with the powdered oil and/or fat composition of Production Comparative Example 1 and stored at 20° C. for 5 months (long-term storage), was 97.6%, which is a much higher value than before the long-term storage. From this, it was judged that the powdered oil and/or fat composition of Production Comparative Example 1 had no commercial value because the repose angle relative value changed significantly and the quality did not remain stable when stored for a long period.

What is claimed is:

1. A method for producing a powdered fat composition containing an fat component that includes one or more XXX-type triglycerides with a fatty acid residue X having x carbon atoms at positions 1 to 3 of glycerin, wherein the number of carbon atoms, x, is an integer selected from 16 to 20, and the fat component includes a β-type fat, and the powdered fat composition has a loose bulk density of 0.05 to 0.6 g/cm³, the method for producing a powdered fat composition comprising the following steps:

(a) preparing a solid fat composition raw material containing XXX-type triglycerides;

(b) heating the solid fat composition raw material obtained in the step (a) at a temperature below a melting point thereof to transform the fat component in the solid fat composition raw material into β-type fat, thereby obtaining a β-type fat-containing composition raw material; and (c) pulverizing the β-type fat-containing composition raw material obtained in the step (b) by collision among raw materials without mechanical pulverization, thereby obtaining a powdered fat composition.

2. The method for producing a powdered fat composition according to claim 1, containing 50% by mass or more of the XXX-type triglycerides in the powdered fat composition when a total mass of the powdered fat composition is set to 100% by mass.

3. The method for producing a powdered fat composition according to claim 1, wherein the temperature below the melting point in the step (b) is lower by 1 to 30° C. than the melting point of the solid fat composition raw material.

4. The method for producing a powdered fat composition according to claim 1, wherein the step (b) is performed while the solid fat composition raw material is left standing.

5. The method for producing a powdered fat composition according to claim 1, wherein the step (b) is performed while the solid fat composition raw material is left non-standing.

6. The method for producing a powdered fat composition according to claim 5, wherein non-standing state is a state of stirring the solid fat composition raw material.

7. The method for producing a powdered fat composition according to claim 1, wherein pulverization by collision among raw materials in the step (c) is pulverization using an airflow pulverizer without mechanical pulverization.

8. The method for producing a powdered fat composition according to claim 1, wherein the solid fat composition raw material containing the XXX-type triglycerides is rapeseed hardened oil.

9. The method for producing a powdered fat composition according to claim 1, wherein the step (b) is a step of heating the solid fat composition raw material obtained in the step (a) at a temperature below a melting point thereof to transform the fat component in the solid fat composition raw material into β-type fat without melting the raw material, thereby obtaining a β-type fat-containing composition raw material.

10. The method for producing a powdered fat composition according to claim 1, wherein the integer is selected from 16 to 18.

\* \* \* \* \*